United States Patent
Zhang et al.

(10) Patent No.: US 11,958,379 B2
(45) Date of Patent: Apr. 16, 2024

(54) UNLOCKING DEVICE OF A MOVABLE PLATFORM FOR REPLACING BATTERY, BATTERY REPLACING PLATFORM AND MOVABLE BATTERY REPLACING PLATFORM

(71) Applicants: SHANGHAI DIANBA NEW ENERGY TECHNOLOGY CO., LTD., Shanghai (CN); AULTON NEW ENERGY AUTOMOTIVE TECHNOLOGY GROUP, Shanghai (CN)

(72) Inventors: Jianping Zhang, Shanghai (CN); Chunhua Huang, Shanghai (CN); Junqiao Zhou, Shanghai (CN); Minghou Zhu, Shanghai (CN); Xiaodong Li, Shanghai (CN); Rui Zou, Shanghai (CN); Shiyong Di, Shanghai (CN)

(73) Assignees: SHANGHAI DIANBA NEW ENERGY TECHNOLOGY CO., LTD., Shanghai (CN); AULTON NEW ENERGY AUTOMOTIVE TECHNOLOGY GROUP, Shanghai (CN)

( * ) Notice: Subject to any disclaimer, the term of this patent is extended or adjusted under 35 U.S.C. 154(b) by 0 days.

(21) Appl. No.: 17/558,532

(22) Filed: Dec. 21, 2021

(65) Prior Publication Data
US 2022/0111755 A1 Apr. 14, 2022

Related U.S. Application Data

(63) Continuation of application No. 16/474,569, filed as application No. PCT/CN2017/119919 on Dec. 29, 2017, now Pat. No. 11,235,680.

(30) Foreign Application Priority Data

Dec. 30, 2016 (CN) .......................... 201611256749.8
Dec. 30, 2016 (CN) .......................... 201611258195.5
(Continued)

(51) Int. Cl.
*B60L 53/80* (2019.01)
*B23P 19/10* (2006.01)
(Continued)

(52) U.S. Cl.
CPC ............... *B60L 53/80* (2019.02); *B23P 19/10* (2013.01); *B60L 53/35* (2019.02); *B66F 7/065* (2013.01);
(Continued)

(58) Field of Classification Search
CPC ............. B23P 19/10; B60K 2001/0455; B60K 2001/0472; B60L 53/35; B60L 53/80; Y02T 90/12
See application file for complete search history.

(56) References Cited

U.S. PATENT DOCUMENTS 635,300 A * 10/1899 Condict ................... B60K 1/04
 104/34
10,017,062 B2 * 7/2018 Kufner .................... B60L 53/18
(Continued)

FOREIGN PATENT DOCUMENTS

CN 1605514 A 4/2005
CN 105806271 A 7/2016
(Continued)

OTHER PUBLICATIONS

WO 2013144955A2 (Heichal, Yoav) Oct. 3, 2013. (Year: 2013).*
(Continued)

*Primary Examiner* — Minh N Trinh

(57) ABSTRACT

Disclosed is an unlocking device, battery replacing platform and movable battery replacing platform. The unlocking
(Continued)

device comprises: a guide rail; a movable seat mounted on the guide rail; an unlocking ejector rod vertically mounted on the movable seat; and a driving member to drive the movable seat to move horizontally along a plane of the guide rail, the driving member is a driving push rod; the movable seat mounted on the guide rail includes a fixing cylinder fixed vertically mounted direct on the movable seat, and the unlocking ejector rod is movably mounted inside of the fixing cylinder, and a second spring is provided in the fixing cylinder, the second spring is configured to apply an upward thrust to the unlocking ejector rod. The unlocking ejector rod can be controlled to move on the predetermined rail, and the battery locking mechanism on the electric vehicle can be automatically unlocked.

16 Claims, 24 Drawing Sheets

(30) Foreign Application Priority Data

Dec. 30, 2016 (CN) .......................... 201611259887.1
Dec. 30, 2016 (CN) .......................... 201621489189.6
Nov. 30, 2017 (CN) .......................... 201711242724.7

(51) Int. Cl.
| | | |
|---|---|---|
| B60L 53/35 | (2019.01) | |
| B66F 7/06 | (2006.01) | |
| B66F 9/065 | (2006.01) | |
| B66F 9/075 | (2006.01) | |
| B66F 9/12 | (2006.01) | |

(52) U.S. Cl.
CPC .......... *B66F 9/065* (2013.01); *B66F 9/07504* (2013.01); *B66F 9/0755* (2013.01); *B66F 9/122* (2013.01); *B66F 2700/04* (2013.01)

(56) References Cited

U.S. PATENT DOCUMENTS

| | | | |
|---|---|---|---|
| 2006/0214634 A1 | 9/2006 | Baba | |
| 2008/0258682 A1 | 10/2008 | Li | |
| 2015/0114736 A1 | 4/2015 | Avganim | |
| 2016/0368464 A1 | 12/2016 | Hassounah | |
| 2022/0111755 A1* | 4/2022 | Zhang | B66F 9/065 |

FOREIGN PATENT DOCUMENTS

| | | | |
|---|---|---|---|
| EP | 2540585 A2 | 1/2013 | |
| JP | S59165670 U | 11/1984 | |
| JP | 1993290660 A | 11/1993 | |
| JP | 06107090 A | 4/1994 | |
| JP | 2003170747 A | 6/2003 | |
| JP | 2007312450 A | 11/2007 | |
| JP | 2009001131 A | 1/2009 | |
| JP | 2009137366 A | 6/2009 | |
| JP | 2010119205 A | 5/2010 | |
| JP | 2011051432 A | 3/2011 | |
| JP | 2011070430 A | 4/2011 | |
| JP | 2012006498 A | 1/2012 | |
| JP | 2012040935 A | 3/2012 | |
| JP | 2012192782 A | 10/2012 | |
| JP | 2014031032 A | 2/2014 | |
| JP | 2015066986 A | 4/2015 | |
| JP | 2016008090 A | 1/2016 | |
| JP | 2016167964 A | 9/2016 | |
| JP | 2016526627 A | 9/2016 | |
| JP | 2016540487 A | 12/2016 | |
| WO | 2012037126 A1 | 3/2012 | |
| WO | 2012105529 A1 | 8/2012 | |
| WO | 2013144953 A1 | 10/2013 | |
| WO | 2016198552 A1 | 12/2016 | |

OTHER PUBLICATIONS

Second Office Action dated Dec. 7, 2021 issued in Brazilian Patent Application No. BR112019013544-8.
Dec. 14, 2021 Office Action issued in Japanese Patent Application No. 2019-556414 .
First Office Action dated Apr. 13, 2022 issued in Indian Patent Application No. 202228014050.
First Office Action dated Apr. 13, 2022 issued in Indian Patent Application No. 202228014049.
First Office Action dated Apr. 13, 2022 issued in Indian Patent Application No. 202228014052.
First Office Action dated Apr. 13, 2022 issued in Indian Patent Application No. 202228014048.
Jul. 18, 2022 First Office Action issued in European Patent Application No. 17885957.5.
Sep. 15, 2022 First Office Action issued in Korean Patent Application No. 10-2022-7002285.
Aug. 31, 2022 First Office Action issued in Korean Patent Application No. 10-2022-7002336.
Sep. 13, 2022 First Office Action issued in Korean Patent Application No. 10-2022-7002408.
Sep. 15, 2022 First Office Action issued in Korean Patent Application No. 10-2022-7002430.
Jun. 20, 2023 First Office Action issued in Vietnamese Patent Application No. 1-2019-04181.
Jul. 14, 2023 Final Office Action for Reexamination issued in Korean Patent Application No. 10-2022-7002285.
First Office Action dated Dec. 20, 2022 issued in Japanese Patent Application No. 2022-073186.
First Office Action dated Feb. 28, 2023 issued in Japanese Patent Application No. 2022-073220.
Mar. 20, 2023 Notice of Rejection issued in Korean Patent Application No. 10-2022-7002285.
Mar. 20, 2023 Notice of Rejection issued in Korean Patent Application No. 10-2022-7002408.
Mar. 28, 2023 First Office Action issued in Japanese Patent Application No. 2022-073250.
Sep. 19, 2023 Second Notice of Reasons for Refusal issued in Japanese Patent Application No. 2022-073220.
Sep. 5, 2023 Second Notice of Reasons for Refusal issued in Japanese Patent Application No. 2022-073250.

* cited by examiner

UNLOCKING DEVICE OF A MOVABLE PLATFORM FOR REPLACING BATTERY, BATTERY REPLACING PLATFORM AND MOVABLE BATTERY REPLACING PLATFORM

CROSS REFERENCE TO RELATED APPLICATIONS

The present application is a Continuation Application of U.S. patent application Ser. No. 16/474,569, now patent No. U.S. Ser. No. 11/235,680, filed on Sep. 30, 2019, which is a national-phase application of PCT Application No. PCT/CN2017/119919 filed on Dec. 29, 2017, which claims the priority to CN patent application CN201611259887.1, CN201611256749.8, CN201611258195.5 and CN201621489189.6 submitted on Dec. 30, 2016 and the Chinese patent application CN201711242724.7 submitted on Nov. 30, 2017, which is hereby incorporated herein by reference in its entirety.

FIELD OF INVENTION

The present invention relates to a field of electric vehicles, and in particular to a movable battery replacing platform and to a quick replacing system using this movable battery replacing platform.

PRIOR ARTS

The existing methods for mounting the battery of the electric vehicles are generally classified into fixed type and replaceable type, wherein the battery in the fixed type is generally fixed on the vehicle and the vehicle is directly regarded as the charging object during charging. However, the battery in the replaceable type is generally mounted in an active manner, and the battery can be removed at any time for replacing or charging, and then the battery will be mounted on the vehicle after the replacing or charging.

When replacing the battery, the movable battery replacing platform needs to accurately align with the battery mounting seat at the bottom of the electric vehicle, so that the unlocking component can unlock the battery in the battery mounting seat and disassemble the battery. In addition, when mounting the battery, the movable battery replacing platform also needs to accurately align with the battery mounting seat at the bottom of the electric vehicle to load the battery. In the above process, if the battery replacing device cannot be in place at one time, it is necessary to perform multiple back and forth movable adjustments, and thereby reducing the battery replacement efficiency.

In addition, in the prior art, in the process of replacing the battery for electric vehicle, battery replacing device usually collides with the battery in the electric vehicle, and thus the battery is easily to be damaged, so that the reliability of replacing the battery is reduced. Therefore, the battery replacing device in the prior art has a defect that the battery is easily to be damaged and the reliability of battery replacing is to be reduced.

In addition, the battery itself is heavier, and if it is manually moved, it will cost much the labor intensity, and it is currently moved in a mechanical method. Because of the weight of the battery, the corresponding driving device also possesses a large size and occupies a large space, which is not advantage to the arrangement of the entire movable battery replacing platform. Furthermore, replacing the also requires precise traveling positioning and relative displacement adjustments which are not available with existing replacement equipment.

CONTENT OF THE PRESENT INVENTION

An object of the present invention is to provide a movable battery replacing platform which can unlock a battery locked on an electric vehicle automatically and adjust an unlocking angle, in order to improve the battery replacing efficiency.

A further object of the present invention is to provide a quick replacing system which employs the movable battery replacing platform mentioned above.

In particular, the present invention provides a movable battery replacing platform, comprising:
  A travel-driving portion used for driving the movable battery replacing platform to move on the ground;
  A lifting portion mounted on the travel-driving portion for realizing the lifting of the battery during replacing the battery;
  A battery mounting portion mounted on the top of the lifting portion for placing a battery to be replaced or a replaced battery, wherein the battery mounting portion is provided with a battery replacing device.

In an embodiment of the invention, the battery replacing device comprises a battery replacing platform of an electric vehicle, and the battery replacing platform comprises:
  An upper board for carrying a replaceable battery:
  An unlocking device mounted on the upper surface of the upper board for unlocking the battery locking device mounted on the electric vehicle:
  A movement-driving device mounted and connected to the upper board through a driving output end for driving the upper board to move in a horizontal direction.

In an embodiment of the invention, the unlocking device comprising a movable seat, an unlocking ejector rob vertically mounted on the upper surface of the movable seat, and a driving member that drives the movable seat to move horizontally along a plane on the upper board.

In an embodiment of the invention, the movement-driving device comprises a driving portion and a screw rod mounted on the driving output end, wherein the screw rod is provided with a pushing board, which is connected with the screw rod through a screw hole, or is fixedly mounted with a nut covered on the screw rod, and the pushing board is fixedly mounted to the lower surface of the upper board;
  Preferably, the screw rod is a ball screw, and the nut is a ball nut.

In an embodiment of the invention, the upper surface of the upper board is further provided with a bridge column for positionally mounting the battery, wherein the bridge column has a groove opening upwardly, and the bridge column is provided with positioning magnetic steel.

And/or the upper surface of the upper board is also provided with a sensor for detecting whether the battery is in place.

In an embodiment of the invention, the upper surface of the upper board is provided with a battery tray, wherein a lower surface of the battery tray is provided with a positioning rod, and the upper surface of the upper board is provided with a spring fixing seat, wherein the positioning rod is matched installed with the spring fixing seat on the upper surface of the upper board.

Preferably, the upper surface of the battery tray has a plurality of guide boards having grooves opening upwardly for mounting and fixing the battery.

In an embodiment of the invention, the battery replacing device includes a battery replacing platform for replacing an electric vehicle battery, and the battery replacing platform includes the upper board mentioned above.

A lower board, which is mounted under the upper board, wherein the movement-driving device is mounted on a lower surface of the lower board by a fixing seat, and a driving output end of the movement-driving device is connected to a pushing board, wherein the pushing board passes through a mounting hole on the lower board and is fixed to a lower surface of the upper board, wherein the movement-driving device drives the upper board to move horizontally relative to the lower board.

In an embodiment of the invention, a sliding device is provided between the upper board and the lower board, wherein the sliding device includes a sliding rail fixed to an upper surface of the lower board, and a slider fixed to the lower surface of the upper board, wherein the slider is engaged with the sliding rail;

Preferably, a receiving groove protruding upward is provided at a position where the upper board is corresponding to the sliding rail, wherein the slider is fixed within the receiving groove;

Further preferably, a sliding board is provided between the upper board and the lower board for reducing the friction therebetween.

In an embodiment of the invention, the battery replacing device comprises a mounting platform for performing battery-replacing of the electric vehicle, the mounting platform comprises:

A mounting board;

An elastic supporting assembly is provided on the mounting board, wherein the elastic supporting assembly is provided with a battery elastic supporting assembly, and the elastic supporting assembly is configured to adjust an inclination of the battery relative to the mounting board to match the battery with a chassis of the electric vehicle.

Wherein, the reliability of replacing the battery is improved in the case of matching the battery with a chassis of the electric vehicle; in addition, it also reduces the hard collision between the mounting platform and the battery, and thereby reduce the stress concentration and will not damage the battery.

In an embodiment of the invention, the mounting platform further comprises:

A tray supported on the elastic supporting assembly, wherein the tray is configured to carry the battery;

Wherein the elastic supporting assembly is used for adjusting the inclination of the tray relative to the mounting board to match the tray with the chassis of the electric vehicle.

Wherein in the case of the tray carrying the battery, it can further reduce the damage of the battery, thereby the reliability of replacing the battery is further improved; in addition, it also reduces any cases of the touches between the tray and the battery, and thereby reduce the stress concentration and will not damage the battery.

In an embodiment of the invention, wherein the elastic supporting assembly comprises:

An elastic member having a heading end and a trailing end along the length direction thereof, wherein the heading end of the elastic member is provided on the mounting board, and the trailing end of the elastic member is used for abutting against the tray.

Wherein the elastic member can adjust the inclination of the tray relative to the mounting board more reliably.

In an embodiment of the invention, a positioning stud is provided on a bottom of the tray;

A receiving cavity is formed in an inner portion of the elastic member along the length direction of the elastic member wherein the two ends of the receiving cavity extend to the heading end and the trailing end of the elastic member respectively;

The positioning stub is provided at the trailing end of the elastic member to be positioned in the receiving cavity.

Wherein the positioning stub can limit the movement of tray in a direction perpendicular to the length direction of the elastic member, and the tray can be supported above the elastic member reliably by the positioning stub. When the tray is provided without a battery, the tray is supported on the elastic member by the positioning stub; when the tray is provided with a battery, the tray will compress the elastic member to make the tray further extent in the receiving cavity.

In an embodiment of the invention, the elastic supporting assembly further comprises:

A positioning member is provided on the upper board and located in the receiving cavity, wherein the positioning member is matched with the positioning stub.

Wherein the tray is positioned by the matching between the positioning member and the positioning stub, such that the tray can be supported above the elastic member, and thereby it is beneficial for improving the reliability of replacing the battery.

In an embodiment of the invention, the top of the positioning member is provided with a receiving groove, wherein the receiving groove is engaged with the positioning stub;

And/or a gap more than 0 is formed between the outer wall surface of the positioning member and the inner wall surface of the elastic member.

Wherein in the case of the positioning stub being engaged in the receiving groove, it brings a simple structure and a reliable connection. In addition, the positioning stub does not enhance the height of the positioning member, or enhance a few height of the positioning member. The height occupied in the receiving groove is much fewer, which is beneficial for the elastic member to be compressed in a great extent, and is also beneficial for improving the reliability of replacing the battery. The present of the gap is used to make the positioning member will not affect the compression of extension of the elastic member during the process of replacing the battery, and can further improve the reliability of replacing the battery.

In an embodiment of the invention, the elastic supporting assembly further comprises:

A limiting member is provided on the mounting board which is used to limit the elastic member to be mounted on the mounting board;

Preferably, the limiting member includes a protecting sleeve and at least one penetrating member, wherein the protecting sleeve is provided on the mounting board and covered to the heading end of the elastic member, wherein the trailing end of the penetrating member passes through the protecting sleeve and the heading end of the elastic member;

Further preferably, the trailing end of the penetration member is located outside of the positioning member;

And/or the penetration member is a screw.

Wherein the reliability of mounting the elastic member will affect the reliability of replacing the battery directly, and the limiting member can improve the mounting reliability of the elastic member on the mounting board, and thereby further improve the reliability of replacing the battery. The protecting sleeve can limit the elastic member moving along circumference thereof, and the penetrating member can prevent the elastic member from flipping out of the mounting board or being taken out by the tray, and thereby the matching between the protecting sleeve and the penetrating member can improve the reliability of mounting the elastic member on the mounting board, and further improve the reliability of replacing the battery. The penetrating member will not stretch into the inside of the positioning member which can affect the matching with the positioning stub and the positioning member of the tray, and thereby it is beneficial for further improving the reliability of replacing the battery.

In an embodiment of the invention, the elastic member is a spring.

In an embodiment of the invention, the number of the elastic supporting assembly is four, and two of the elastic supporting assemblies are front elastic supporting assemblies corresponding to the front direction of the electric vehicle, and the other two elastic supporting assemblies are rear elastic supporting assemblies corresponding to the rear direction of the electric vehicle;

The height of the front elastic supporting assembly is lower than the one of the rear elastic supporting assembly, and the height difference between the front elastic supporting assembly and the rear elastic supporting assembly is matched with the chassis of the electric vehicle.

Wherein the matching between the height difference (which is between the front elastic supporting assembly and the rear elastic supporting assembly) and the chassis of the electric vehicle make each member of the tray contact with the battery at the same time as much as possible, and thereby improve the reliability of replacing the battery. In addition, it will reduce or prevent the hard collision between the mounting platform and the battery. Moreover, the tray can basically realize a full area contact of the battery, and it can reduce or prevent the stress concentration, and thereby reduce the damage to the battery.

In an embodiment of the invention, the travel-driving portion comprises:

A movable device includes a chassis for moving and supporting;

A synchronous driving device includes a synchronous belt, a clamping device engaged with the synchronous belt and fixed to the chassis, and a fixing seat for the synchronous belt, wherein two ends of the synchronous belt are respectively mounted in the fixing seat for the synchronous belt, and the clamping device is used for driving the chassis to move horizontally along an extension path of the synchronous belt.

In an embodiment of the invention, the clamping device comprises a synchronous pulley where a radial rack is provided on the outer circumferential surface of the synchronous pulley, and a motor for driving rotation of the synchronous pulley, wherein the synchronous pulley and the motor are mounted with the chassis by a supporting seat, wherein the surface of the synchronous belt has a rack or a tooth groove, and the synchronous belt is engaged with the surface of the synchronous pulley by the rack or the tooth groove;

Preferably, the clamping device further comprises a transiting wheel which is mounted on the supporting seat, wherein the transiting wheel are located on both sides of the rotating direction in back and forth of the synchronous pulley.

In an embodiment of the invention, the movable device further comprises two tracks mounted in parallel with the synchronous belt, and a scroll wheel mounted on the track, wherein the scroll wheel is mounted on the chassis;

Preferably, the scroll wheel respectively comprises a cylindrical load bearing wheel and a guide wheel with a convex circle on opposite sides of the chassis, the load bearing wheel and the guide wheel are respectively mounted on a U-shaped fixing seating by means of an axis passing through the center, the fixing seating is fixed to the chassis.

In an embodiment of the invention, the synchronous driving device further comprise tension adjusting devices for the synchronous belt, wherein the tension adjusting devices are respectively mounted at the fixing position which position at two ends of the synchronous belt and is used to adjust the elasticity relaxation level of the synchronous belt;

Preferably, the fixing seat for the synchronous belt comprises a first synchronous seat and a second synchronous seat, wherein the tension adjusting device is mounted to the first synchronous seat and/or the second a synchronous seat, wherein the adjusting device comprises a clamping block for clamping the synchronous belt, and an adjusting portion for adjusting a reciprocating movement of the clamping block in an extending direction of the synchronous belt;

Further preferably, the clamping block comprises a clamping board and a tooth holder which implement the clamping on the upper and lower sides of the synchronous belt respectively, wherein the adjusting portion comprises an adjusting bolt fixed on the first synchronous seat or the second synchronous seat by a screw hole, and one end of the adjusting bolt is actively connected with the clamping block.

In an embodiment of the invention, the movable device further comprises a mounting bracket for placing the battery replacing device and a screw rod positioning device, wherein the mounting bracket mounted to the upper surface of the chassis, the screw rod positioning device is fixedly mounted on the chassis and is connected to the mounting bracket for driving the mounting bracket to move in a direction perpendicular to the moving direction of the chassis;

Preferably, the screw rod positioning device comprises a screw rod and a feeding motor for driving the screw rod, wherein one end of the screw rod is connected with a pushing board, and the pushing board is fixedly mounted with the mounting bracket;

Further preferably, the pushing board is connected to the screw rod by a threaded hole, or is fixedly mounted with an adjusting nut covering on the screw rod;

Further preferably, a sliding device is provided between the chassis and the mounting bracket, wherein the sliding device includes a sliding groove mounted on the chassis, and a slider fixed on the mounting bracket and stuck on the sliding groove.

In an embodiment of the invention, further comprising a towing chain device for receiving a cable, the towing chain device comprising:

A receiving groove is mounted to one side of the movable device and extends in a direction of the synchronous belt;

Connecting member, which has a plurality of connecting members, wherein the plurality of connecting members rotatably connected to each other to form a towing chain, and one end of the towing chain is fixed at a fixing point in the receiving groove, and the other end is fixedly connected to the chassis;

Preferably, the connecting member comprises two connecting boards which is disposed oppositely with each other, and two partition boards spaced apart which is used to fix the two connecting boards together in parallel with each other, wherein the plurality of connecting members are rotatably coupled to each other to form a structure with a hollow passage by the connecting boards, wherein the two ends of the connecting board are respectively connected portions, and the connecting boards are connected by screws or engaging structure;

Further preferably, the two connecting ends of the connecting boards respectively have an active engaging structure and a passive engaging structure, wherein the active engaging structure comprises an axis hole penetrating the connecting portion, and a limiting circle disposing outside of the axis hole and the inner diameter of the limiting circle is larger than the diameter of the axis hole; wherein the passive engaging structure comprises an axis hole penetrating the connecting portion, wherein the edge of the axis hole is provided with a convex circle having an outer diameter smaller than or equal to the inner diameter of the limiting circle.

In an embodiment of the invention, the travel-driving portion is used to drive the entire battery replacing device to move horizontally, which comprises a movable frame for moving and providing a mounting base, and a horizontal driving device for driving the movable frame;

The lifting portion is configured to drive the battery replacing platform to lift and descend in a vertical direction;

The battery mounting portion further comprises a battery unlocking device mounted on the battery replacing platform.

In an embodiment of the invention, the horizontal driving device comprises a synchronous belt and a clamping driving device engaged with the synchronous belt and fixed on the movable frame, wherein the clamping driving device drives the movable frame to move horizontally along the synchronous belt;

Preferably, the clamping device comprises a synchronous pulley having a radial rack on the outer circumferential surface, and a transiting wheel respectively located on both sides of the synchronous pulley to champ the synchronous belt on the synchronous pulley, and a motor that drives the rotation of the synchronous pulley;

Further preferably, the horizontal driving device further comprises a first synchronous seat and a second synchronous seat that respectively fix the two ends of the synchronous belt, wherein an adjusting device is mounted on the first synchronous seat and/or the second synchronous seat, and the adjusting device is used to adjust the elasticity relaxation level of the synchronous belt;

And further preferably, the adjusting device comprises a clamping block for clamping the synchronous belt, and an adjusting portion for adjusting a position of the clamping block relative to the first synchronous seat or the second synchronous seat, wherein the clamping block comprises a clamping board and tooth holder champing the synchronous belt from two sides respectively, wherein the adjusting portion comprises an adjusting bolt fixed on the first synchronous seat or the second synchronous seat by a screw hole, and one end of the adjusting bolt is actively connected with the clamping block.

In an embodiment of the invention, the travel-driving portion further comprises a mounting bracket mounted on the movable frame and a screw rod positioning device for adjusting of the position of the mounting bracket relative to the movable frame, wherein the screw rod positioning device comprises a screw rod driving device fixed on the movable frame, and a pushing board fixed on the mounting bracket and connected to the screw rod on the screw rod positioning device.

In an embodiment of the invention, the lifting portion comprises a scissor lifting mechanism mounted on the movable frame and a vertically driving mechanism driving the scissor lifting mechanism to vertically lift and descend, wherein the scissor lifting mechanism comprises a lifting board for mounting the battery mounting portion, wherein the driving mechanism is a hydraulic driving mechanism.

In an embodiment of the invention, the battery replacing platform comprises an upper board which is mounted on a top of the lifting portion, and the unlocking device is mounted on the upper surface of the upper board, wherein the unlocking device comprises a movable seat, an unlocking ejector rod vertically mounted on the upper surface of the movable seat, and a driving member that drives the movable seat to move horizontally along a plane of the upper board;

Preferably, a movement-driving device is further mounted on the battery replacing platform, wherein the movement-driving device is connected to the upper board through a driving output end for driving the upper board to move in a horizontal direction;

Further preferably, the movement-driving device comprises a screw rod and a driving device for driving the movement of the screw rod, wherein the screw rod is mounted on the driving output end of the driving device, and the pushing board is mounted on the screw rod, wherein the pushing board is connected to the screw rod through a threaded hole, or fixedly mounted to the nut covered on the screw rod, wherein the pushing board is fixedly mounted to the lower surface of the upper board.

In an embodiment of the invention, the battery replacing platform further comprises a power portion, which comprises a power supply used to supply the electric power for the horizontal driving mechanism and the vertical driving mechanism, and the controlling unit used to control the operation of each component according to the commands.

In an embodiment of the invention, the upper surface of the battery mounting portion is provided with a battery tray, which is configured to mount and position the battery.

In an embodiment of the invention, the battery tray comprises:

A tray has a frame structure;

A guide board is mounted on a periphery of the upper surface of the tray, which has a groove opening upward for guiding the fixing block of the battery side wall be in stuck to mount and fix the battery.

In an embodiment of the invention, the lower surface of the tray is provided with a positioning rod for positioning and mounting of the tray;

Preferably, the positioning rod is a tapered rod extending downwardly, wherein the tapered rod is provided in plurality and distributed around the periphery of the lower surface of the tray.

In an embodiment of the invention, the guide board is provided with a detecting device for detecting whether the battery is in position or not;

Preferably, the detecting device is a magnetic member or a sensor.

In an embodiment of the invention, a pallet is vertically mounted on a lower surface of the tray for being stuck into the groove of the battery moving platform to fix and mount the tray;

Preferably, an L-shaped stiffener is mounted on the lower surface of the tray for placing on a support board of the battery moving platform to support the tray;

Further preferably, reinforcing boards are respectively disposed at each corner of the mounting opening, wherein one side of the pallet is connected with a reinforced panel which is fixed to the lower surface of the tray.

The present invention further provides a quick replacing system, wherein comprises: the movable battery replacing platform mentioned above.

In an embodiment of the invention, the quick replacing system further comprises:

A battery holder is used to place a replacement battery of the electric vehicle, and a battery to be charged which is replaced from the electric vehicle;

A palletizer is used to place the replaced battery to be charged in the battery holder, and to take down the replacement battery from the battery holder.

The positive effects of the present invention are:

The movable battery replacing platform of the present invention can unlock the battery locked at the bottom of the electric vehicle by using the unlocking device. It automatically aligns the unlocking point in the battery locking mechanism, and realize an automatic unlocking during the movement. The whole process is completely automated with none manual intervention and thus improve the battery replacement efficiency. In addition, the movement-driving device can adjust the angle of the upper board relative to the unlocking position, so that automatically adapting the unlocking point of the battery without moving the entire movable battery replacing platform, and thereby further improve the unlocking efficiency.

The battery is matched with the chassis of the electric vehicle which improve the reliability of replacing the battery; in addition, it reduces the hard collision between the mounting platform and the battery, and thereby reduce the stress concentration and thus will not damage the battery easily.

The invention can also realize the precise traveling positioning of the movable battery replacing platform by the synchronous driving device, which can stay at any position on the traveling route while ensuring the traveling speed. At the same time, it can also limit the moving direction of the movable battery replacing platform and the stability during traveling.

The screw rod positioning device can adjust the position of the movable battery replacing platform in the direction perpendicular to the traveling direction, and thereby further improve the alignment effect when replacing the battery.

The invention also constitutes a complete electric vehicle automatic battery quick replacing system through a battery holder, a palletizer and a movable battery replacing platform, and can realize an assembly line work of battery quick replacing operation for a plurality of electric vehicles. When replacing, as long as the electric vehicle stops at the specified position, the battery can be automatically replaced within five to ten minutes. The entire replacement process does not require manual intervention, which can reduce labor intensity and greatly improve replacement efficiency.

The movable battery replacing platform of the invention can also automatically realize the disassembly and replacement of the battery of the electric vehicle, which can minimize the operation height in the replacement structure, so that the lifting arm can reduce the height within the weight range of the battery, and thereby reduce the required replacement space. With a cross-shaped lifting structure, the lifting height can be precisely controlled while ensuring the stability of the entire lifting process in the vertical direction. The synchronous belt can be used to improve the stability of the movement.

DRAWINGS

DETAILED DESCRIPTION OF THE PREFERRED EMBODIMENT

The invention is further illustrated by the following embodiments, which are not intended to limit the invention.

Embodiment 1

Figure 1:
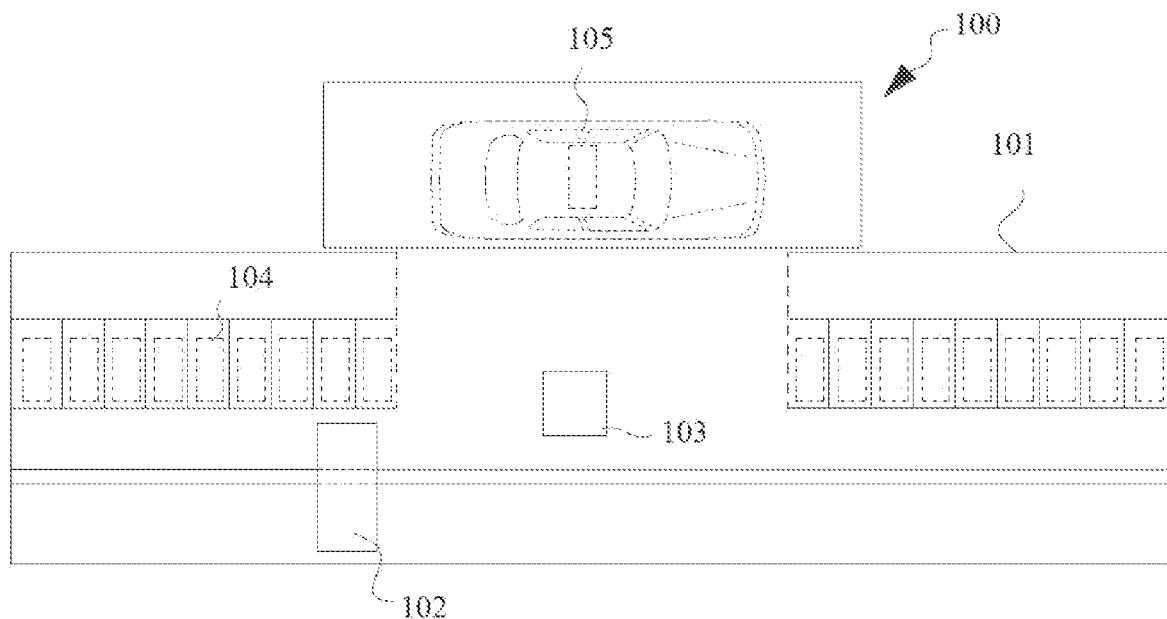
FIG. 1 is a schematic structural diagram of a quick replacing system according to an embodiment of the embodiment 1 of the present invention.

As shown in FIG. 1, the quick replacing system 100 in accordance with one embodiment of the present invention generally includes a battery holder 101 for placing a battery 104, a palletizer 102, and a movable battery replacing platform 103.

The battery 104 placed in the battery holder 101 includes a replacement battery for the replacement of electric vehicle 105, and a battery to be charged replaced from the electric vehicle 105. The battery holder 101 is provided with a plurality of placement layers formed of frames.

The movable battery replacing platform 103 is configured to remove and transport the battery to be charged on the electric vehicle 105 to the palletizer 102, while receiving the replacement battery from the palletizer 102 and mounting it on the electric vehicle 105; including a lifting device which can lift and descend the battery 104, and a battery mounting portion mounted on the lifting device for automatically removing the battery to be charged on the electric vehicle 105 or automatically mounting the replacement battery to the electric vehicle 105.

The palletizer 102 is used to replace the replacement battery to be replaced of the movable battery replacing platform 103 in the battery holder 101, and at the same time, removing the replacement battery from the battery holder 101 to the movable battery replacing platform 103, the palletizer 102 performs movement in the horizontal and vertical directions relative to the battery holder 101 through tracks, which includes an extendable telescoping bracket for picking up and descending the battery 104.

In operation, the battery holder 101, the palletizer 102 and the movable battery replacing platform 103 constitute a complete electric vehicle automatic battery quick replacing system, which can realize the assembly line quick replacing operation for a plurality of electric vehicles. When replacing, as long as the electric vehicle stops at the designated position, the battery can be automatically replaced within five to ten minutes. The entire replacement process does not require manual intervention, which reduces labor intensity and greatly improves replacement efficiency.

Figure 2:
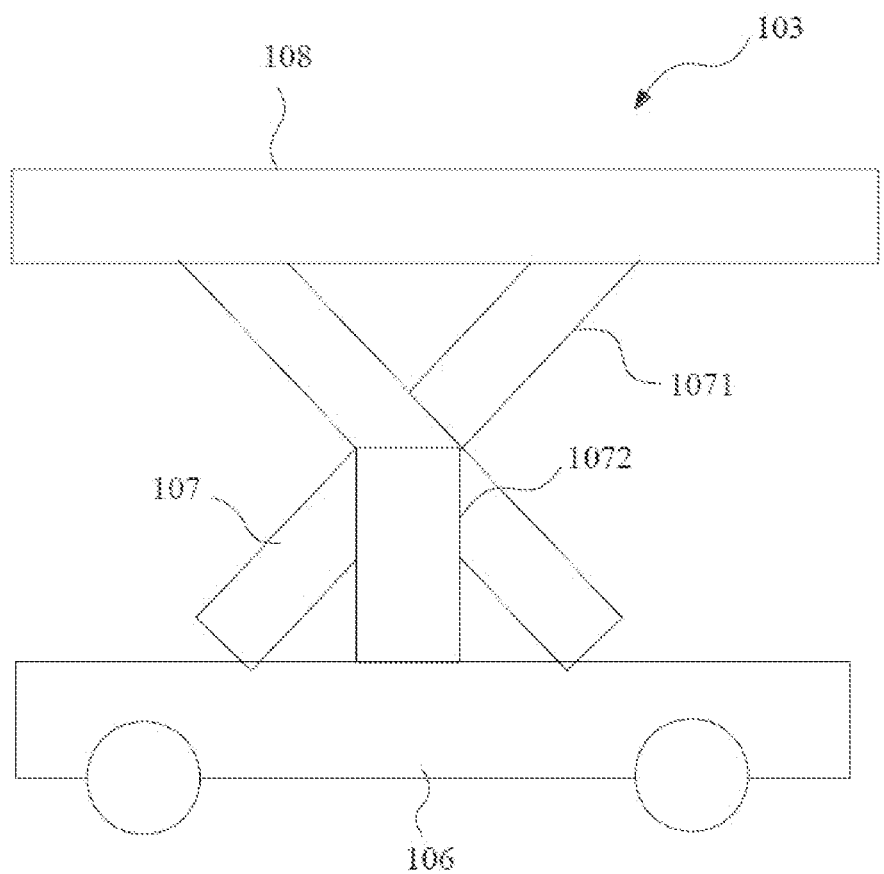
FIG. 2 is a schematic structural view of the movable battery replacing platform shown in FIG. 1.

As shown in FIG. 2, the movable battery replacing platform 103 of one embodiment of the present invention generally includes a lifting portion 107, a battery mounting portion 108, and a travel-driving portion 106.

The travel-driving portion 106 is used to drive the movement of the entire device during the pick-and-place process and replacement process of the battery 104. The specific driving method may be any existing hoisting drive, rack and winching drive, roller drive or track drive, etc., which can realize the movement of the movable battery replacing platform 103.

The lifting portion 107 is mounted on the travel-driving portion 106 for realizing the lifting control of the battery 104 at the bottom of the electric vehicle 105 during the process of replacing the battery 104, which includes a lifting device 1071 that can be vertically moved up and down, and the lifting driving portion 1072 that drives the lifting device 1071 to ascend and descend. Specifically, the lifting device 1071 may be any existing structure which can be stretchable in the vertical direction, such as a stretchable rod structure, a rail structure, a stretchable tube structure, or the like. The lifting driving portion 1072 may be a conventional power such as a hydraulic drive, an electric drive, or a pneumatic drive.

The battery mounting portion 108 is disposed at the top of the lifting device 1071 for placing a replacement battery or a replaced battery to be charged. The upper surface of the battery mounting portion 108 is provided with a battery replacing device. The battery replacing device in this embodiment is a battery replacing platform for replacing the battery of an electric vehicle, wherein the battery replacing platform is equipped with an unlocking device, which unlock the battery locking mechanism on the electric vehicle under the control of the corresponding driving device, and thus the battery 104 on the electric vehicle 105 is automatically disassembled and locked.

The movable battery replacing platform 103 of the present embodiment moves to the bottom of the electric vehicle 105 under the control of the travel-driving portion 106, and the lifting driving portion 1072 drives the lifting device 1071 to ascend, and the unlocking device contacts with the locking device which is mounted on the battery mounting seat at the bottom of the electric vehicle 105, in order to release the locked battery, and then control the battery mounting portion 108 to move in the horizontal direction to disengage the unlocked battery to be charged from the electric vehicle and directly drop on the battery mounting portion 108; the lifting device 1071 is controlled to descend by the lifting driving portion 1072, and the travel-driving portion 106 drive the movable battery replacing platform 103 to move to the battery holder 101, and the battery to be charged is removed by the palletizer 102, at the same time, the replacement battery is replaced; the travel-driving portion 106 drives the movable battery replacing platform 103 to move back to the lower side of the electric vehicle 105, and the lifting portion 1072 drives the lifting device 1071 to ascend, so that the battery mounting portion 108 stuck the replacement battery into the battery mounting seat of the electric vehicle 105, and the battery mounting portion 108 is then translated to lock the replacement battery in the battery mounting seating, and then the lifting driving portion 1072 is descend by the lifting device 1071, and the travel-driving portion 106 moves the movable battery replacing platform 103 out of the bottom of the electric vehicle 105, and thus achieving an entire automatic replacing battery process of the electric vehicle 105.

As shown in FIGS. 3, 4, 5, and 9, a battery replacing platform according to an embodiment of the present invention generally includes an upper board 10 carrying a replacement battery, the unlocking device 50 for unlocking the battery locking device mounted on the upper board 10 of the electric vehicle and movement-driving device 31 mounted on the upper board 10 by the driving output end.

The unlocking device 50 is mounted on the upper surface of the upper board 10, and includes a guide rail 59, a movable seat 52 mounted on the guide rail 59, an unlocking ejector rod 51 vertically mounted on the upper surface of the movable seat 52, and a driving push rod 57 to drive the movable seat 52 to move along the guide rail 59.

The movement-driving device 31 is configured to drive the upper board 10 to produce horizontal movement at a current position, which includes a ball screw 312 mounted on a lower surface of the upper board 10, and a driving device 311 fixed to the fixing point for driving the movement of the ball screw 312. The fixing point here may be a battery replacing platform 103 for replacing the battery, which is a fixed position relative to the upper board 10.

In the present embodiment, before replacing the battery, the driving push rod 57 of the unlocking device 50 drives the movable seat 52 to horizontally move on the upper surface of the upper board 10 along the guide rail 59, and stays at the unlocking point of the battery locking mechanism of the electric vehicle, and then the movable battery replacing platform 103 is further ascend, and the unlocking ejector rod 51 contacts the unlocking point in the battery locking mechanism during the ascending process and jacks up the unlocking point to unlock the battery. During the battery replacing process, if the upper board 10 is not aligned to the battery mounting position, the ball screw 312 can be driven to rotate by the driving device 311, so that the upper board 10 is horizontally moved relative to the movable battery replacing platform 103, thereby the unlocking device 50 of the upper board and the position of the battery locking mechanism of the electric vehicle are accurately aligned.

By matching up unlocking ejector rod 51 and the driving push rod 57 and the movable seat 52 with each other, the unlocking ejector rod 51 can be controlled to move on the predetermined rail, and the battery locking mechanism on the electric vehicle can be automatically unlocked, so that the battery is detached from the electric vehicle and replaced by the movable battery replacing platform 103 automatically. Under the control of the movement-driving device 31, the moving direction of the upper board 10 and the movable battery replacing platform 103 is perpendicular with each other, and can accurately realize the alignment requirement when replacing the battery. The above process is fully automated and requires no manual intervention, and improve battery replacement efficiency.

Figure 6:
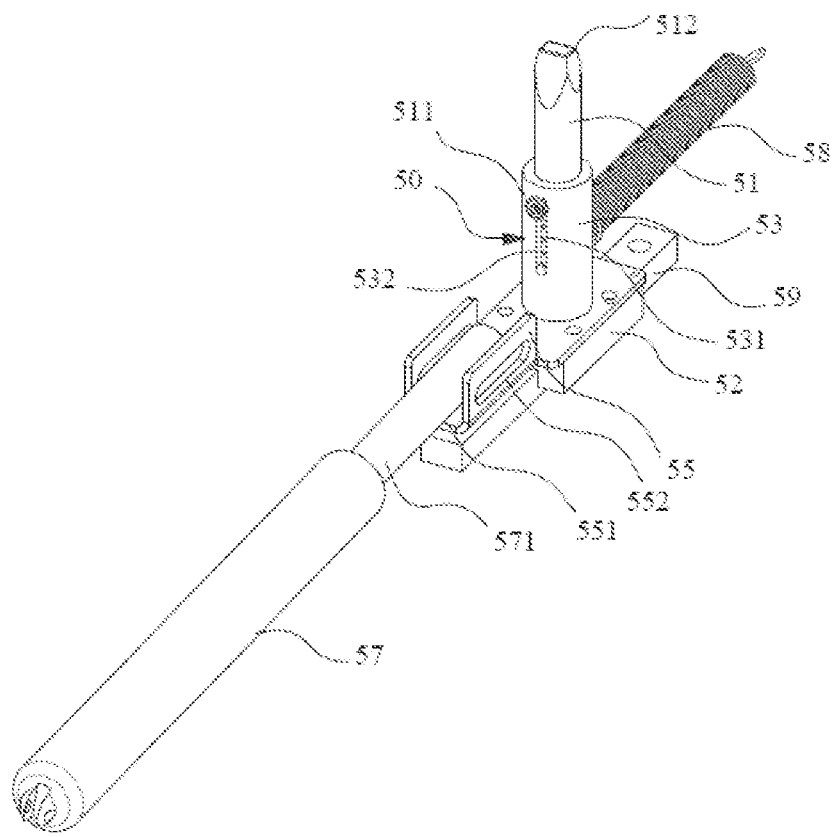
FIG. 6 is a perspective view of the unlocking device shown in FIG. 5.

As shown in FIG. 6, in an embodiment of the present invention, the unlocking device 50 further includes a hollow fixing cylinder 53 fixed vertically on the upper surface of the movable seat 52, and the unlocking ejector rod 51 is movably mounted inside of the fixing cylinder 53 but cannot disengaged from the fixing cylinder 53, and a spring 532 that applies a thrust to the unlocking ejector rod 51 is placed in the fixing cylinder 53, while the unlocking ejector rod 51 is mounted at the opening of the fixing cylinder 53 by the spring 532. When the unlocking ejector rod 51 is in contact with the battery locking mechanism at the bottom of the electric vehicle, it can be retracted into the fixing cylinder 53 within a certain range to prevent the unlocking ejector rod 51 from colliding with the unlocking point and causing damage.

In one embodiment of the present invention, a strip-shaped groove 531 extending along the axial direction of the fixing cylinder 53 may be formed on the side wall of the fixing cylinder 53, the limiting member 511 of the strip-shaped groove 531 is provided on a side within the fixing cylinder 53 of the unlocking ejector rod 51, when the unlocking ejector rod 51 moves under the elastic force of the spring 532, the limiting member 511 can synchronously slide with the unlocking ejector rod 51 in the strip-shaped groove 531 to prevent the unlocking ejector rod 51 from being disengaged from the fixing cylinder 53. In order to facilitate the unlocking ejector rod 51 in contact with the unlocking point, the end of the unlocking ejector rod 51 located outside the fixed cylinder may be a contracted tapered end 512.

In an embodiment of the present invention, a sliding seat 55 may be disposed on a side of the movable seat 52 near the driving push rod 57. The sliding seat 55 has a sliding groove 551 disposed along the extending direction of the driving push rod 57. A fixing member that is inserted into the sliding groove 551 is provided on the driving push rod 57, and the driving push rod 57 drives the movable seat 52 and the unlocking ejector rod 51 to move horizontally by the fixing member sliding along the sliding groove 551. The structure can make the movable seat 52 have a range of motion, that is, the movable seat 52 or the unlocking ejector rod 51 can move within the length of the sliding groove 551 when encountering a lateral force, thereby avoiding the driving push rod 57 connected directly and deformation further occurs between thereof.

In an embodiment of the present invention, the unlocking device 50 may further include a returning device that keeps the movable seat 52 in the unlocked position at all times, and the returning device includes a stretchable elastic member 58 mounted on the side of the movable seat 52 opposite to the driving push rod 57. The elastic member 58 always applies a pulling force to the movable seat 52 to be positioned at a specified position of the guide rail 59, and thereby restricting the unlocking ejector rod 51 at a position corresponding to the unlocking point. The elastic member 58 may be an elastic member such as a spring having an elastic force.

Figure 4:
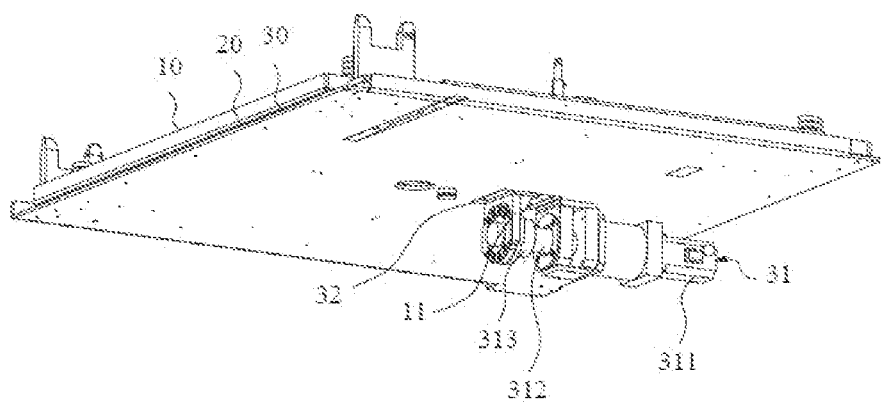
FIG. 4 is a schematic structural view of the bottom of the battery replacing platform shown in FIG. 3.
Figure 5:
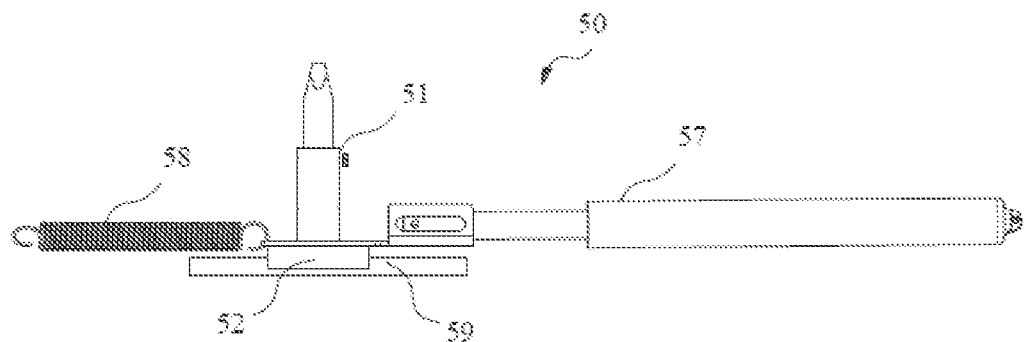
FIG. 5 is a schematic structural diagram of an unlocking device according to an embodiment of the embodiment 1 of the present invention.
Figure 7:
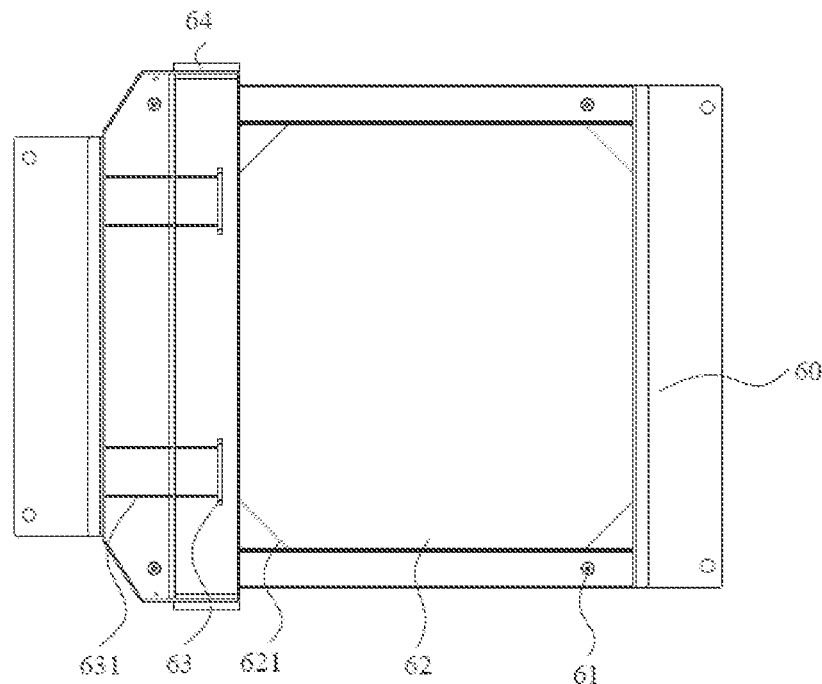
FIG. 7 is a schematic structural view of a battery tray according to an embodiment of the embodiment 1 of the present invention.
Figure 8:
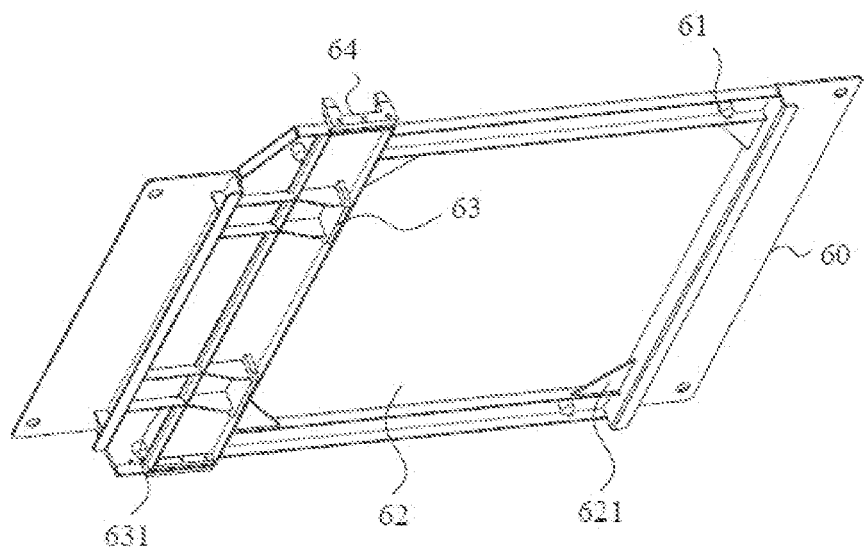
FIG. 8 is a perspective view of the battery tray shown in FIG. 7.
Figure 10:
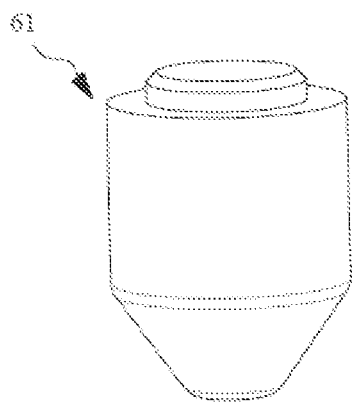
FIG. 10 is a schematic structural view of a tapered rod according to an embodiment of the embodiment 1 of the present invention.

As shown in FIG. 4, in an embodiment of the present invention, in order to facilitate the movement of the upper board 10, the pushing board 11 may be fixed on the lower surface of the upper board 10, and the ball nut 313 may be covered on the ball screw 312, the pushing board 11 is fixed to the ball nut 313. When the driving device 311 drives the ball screw 312 to rotate, the ball nut 313 can move along the ball screw 312, and thus the upper board 10 can be moved in the horizontal direction by the pushing board 11 fixed thereto. Another connection method between the upper board and the screw rod is to insert a pushing board with a threaded hole at one end of the screw rod, the pushing board is fixedly mounted with the upper board, and the driving device drives the screw rod to drive the pushing board to move horizontally, thereby driving the upper board moving in horizontal direction. As shown in FIGS. 7, 8, and 10, in one embodiment of the present invention, a battery tray 60 may be mounted on the upper surface of the upper board 10, which has a board-like structure and is provided with a hollow in the middle of the battery tray 60. A positioning rod 61 is provided on the lower surface, which is a tapered rod, and a guiding board 64 is vertically mounted on opposite sides of the upper surface, and the guiding board 64 is fixedly mounted with the battery tray 60. The U-shaped groove 641 with an opening upward, in order to position and mount the battery, a bridge column may be installed on the upper surface of the upper board 10, the bridge column has grooves opening upwardly, and is mounted with a positioning magnetic steel, the bridge column of the upper board 10 and the guide boards on the tray 60 of the battery cooperate to collectively carry the battery.

At the same time, a fixing seat 15 for the spring 16 on which is mounted is disposed at the upper surface of the board 10 corresponding to the tapered rod 61. The hole for mounting the spring 16 is a tapered hole, and after inserted into the corresponding spring 16 through the positioning rod 61, the battery tray 60 is snapped into the tapered hole and thus mounted on the upper board 10.

When in use, the battery tray 60 is movably placed on the upper board 10, and the battery to be replaced or replaced is placed on the battery tray 60. The bridge column 64 on the battery tray 60 is spliced positioning with the corresponding side position of the battery by the U-shaped groove 641, and the weight of the battery causes the battery tray 60 to completely press against the elastic force of the spring 16 to press on the upper board 10. The tapered rod 61 is simultaneously inserted into the tapered hole to form a stable fixing relationship, and the bottom of the battery passes through the mounting opening 62 and approaches or contacts the upper board 10 to facilitate detection of the state of the battery by sensors mounted on the upper board 10, thereby providing control information for the control of the control unit.

Figure 9:
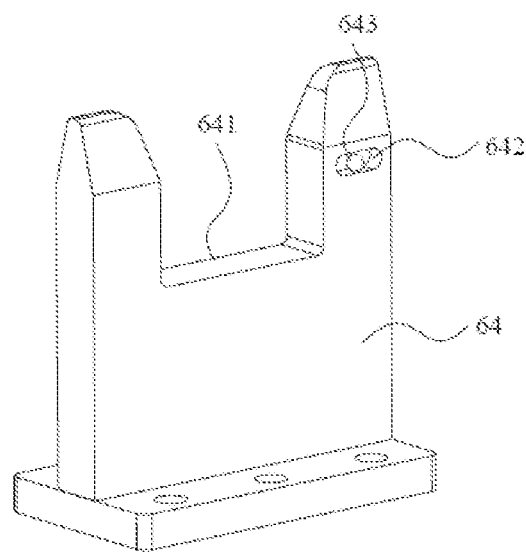
FIG. 9 is a schematic structural view of a bridge column according to an embodiment of the embodiment 1 of the present invention.

In order to improve the stability of the battery tray 60, the number of the positioning rods 61 may be four and symmetrically distributed at the four corners of the battery tray 60. As shown in FIG. 9, in order to know whether the battery is placed in position, a detecting device 643 for detecting the plugged battery may be disposed on the bridge column 64, and the detecting device 643 may be mounted on the bridge column 64 through a mounting hole 642 provided on the bridge column. The detection device 643 can be a magnetic member or a sensor. The magnetic member can interact with the magnetic member of the corresponding portion of the battery to determine if the battery has been placed in place. The sensor can sense to determine whether the battery is in place or not. The mounting opening 62 may be rectangular, and a reinforcing board 621 may be respectively disposed at four corners of the mounting opening 62. The reinforcing board 621 can increase the strength of the entire tray.

In one embodiment of the present invention, the board-shaped pallet 63 may be vertically fixed on one side of the lower surface of the battery tray 60, and a slot 14 for inserting the pallet 63 may be provided at a position corresponding to the pallet 63 at the upper surface of the upper board 10. After the battery tray 60 is mounted on the upper board 10, the pallet 63 is engaged with the slot 14, thereby reducing the amount of movement of the battery tray 60 relative to the upper board 10.

The number of the specific slots 14 may be two. The two slots 14 are arranged on one side on the upper surface of the upper board 10. The pallet 63 may also be disposed in two and respectively connected to the corresponding slots 14. Further, in order to increase the strength of the pallet 63, a corresponding reinforcing board 631 may be provided on one side of the pallet 63, which is simultaneously perpendicularly connected to the lower surface of the battery tray 60 and the pallet 63.

Figure 3:
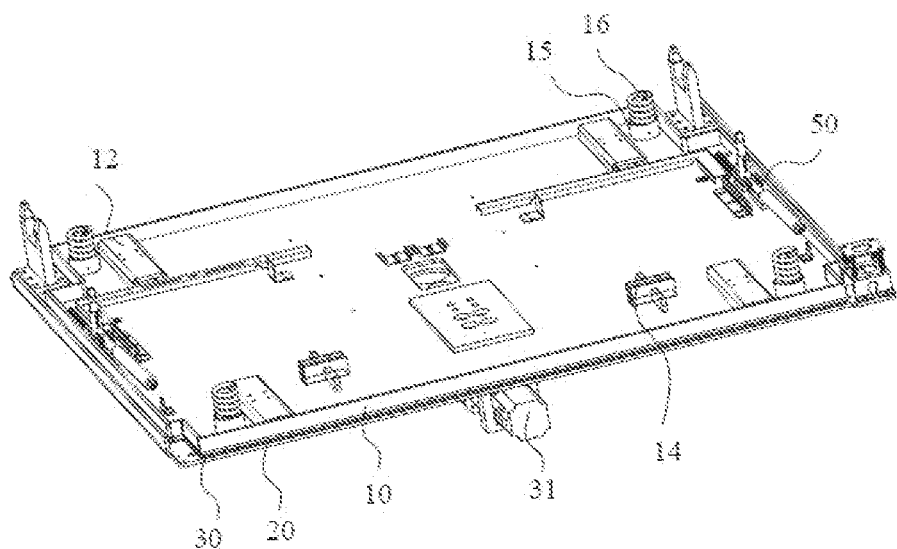
FIG. 3 is a schematic structural view of a battery replacing platform according to an embodiment of the embodiment 1 of the present invention.

As shown in FIGS. 3 and 4, in one embodiment of the present invention, a battery replacing platform including an upper board 10 and a lower board 30 is provided. The upper board 10 is mounted on the upper surface of the lower board 30, the upper board 10 and the lower board 30 are in a plain shape, and a driving device 311 is fixed on the lower surface of the lower board 30. The driving device 311 is mounted on the lower surface of the lower board by a fixing seat, and the ball screw 312 is mounted on the driving output end of the driving device 311 at the lower board. The position corresponding to the lower board 30 and the ball screw 312 is provided with a mounting hole 32. The driving device 311 is configured to drive the ball screw 312 passing through the mounting hole 32 to drive the pushing board to move horizontally. The movement of the pushing board drives the upper board 10 to be generated relative to the lower board 30 for moving horizontally. Specifically, the fixing structure of the ball screw 312 and the upper board 10 may be: a ball nut 313 is covered on the ball screw 312, and a pushing board 11 is fixed on the lower surface of the upper board 10, and after the ball nut 313 is fixed to the pushing board 11, the ball screw 312 is defined on the lower surface of the upper board 10, or a threaded pushing board is covered on the ball screw, and then the pushing board is fixedly coupled to the upper board 10. The driving device 311 may be a feeding motor, and the feeding motor may be directly connected to the ball screw 312 or may be connected to the ball screw 312 through a speed reducer.

In the present embodiment, the upper surface of the upper board 10 can be mounted with various components that facilitate mounting the battery, such as the unlocking device 50. The upper board 10 is movably placed on the lower board 30, and the lower board 30 can be mounted on the surface of the movable battery replacing platform 103, and the driving device 311 is fixedly mounted on the lower surface of the lower board 30, so that the driving device 311 can drive the upper board 10 moved relatively without any movement itself while control the ball wire. In this embodiment, the angle at which the battery is installed or the battery is unlocked can be adjusted by the relative movement of the upper board 10, and thus improve the efficiency of automatically replacing the battery of the movable battery replacing platform 103.

Figure 11:
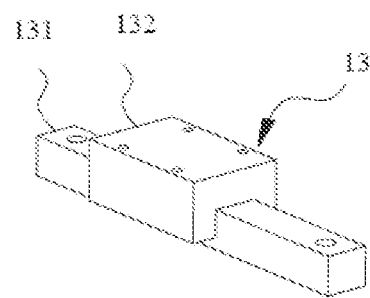
FIG. 11 is a schematic structural view of a sliding device according to an embodiment of the embodiment 1 of the present invention.

As shown in FIG. 11, in order to facilitate the movement of the upper board 10, in one embodiment of the present invention, a sliding device 13 having the same moving direction as the ball screw 312 can be mounted between the upper board 10 and the lower board 30. The frictional resistance between the upper and lower boards can be alleviated by the sliding device 13 while making the movement of the upper board 10 more smoother.

Specifically, the sliding device 13 may include a slide rail 131 fixed to the upper surface of the lower board 30, and a slider 132 fixed to the lower surface of the upper board 10 to engage with the slide rail 131. When the upper board 10 is moving, the slider 132 is simultaneously driven to move on the sliding rail 131. In order to reduce the gap between the upper board 10 and the lower board 30, the receiving groove 12 protruding from the upper surface of the upper board 10 may be disposed at a position corresponding to the upper board 10 and the sliding rail 131, and the slider 132 is fixed in the receiving groove 12. The installed sliding rail 131 protrudes from the upper surface of the lower board 30 and enters the receiving groove 12 of the upper board 10, and the slider 132 is simultaneously fixed in the receiving groove 12 and is engaged with the sliding rail 131. When moving, the upper board 10 drives the slider 132 to move relative to the slide rail 131 by the receiving groove 12.

Figure 12:
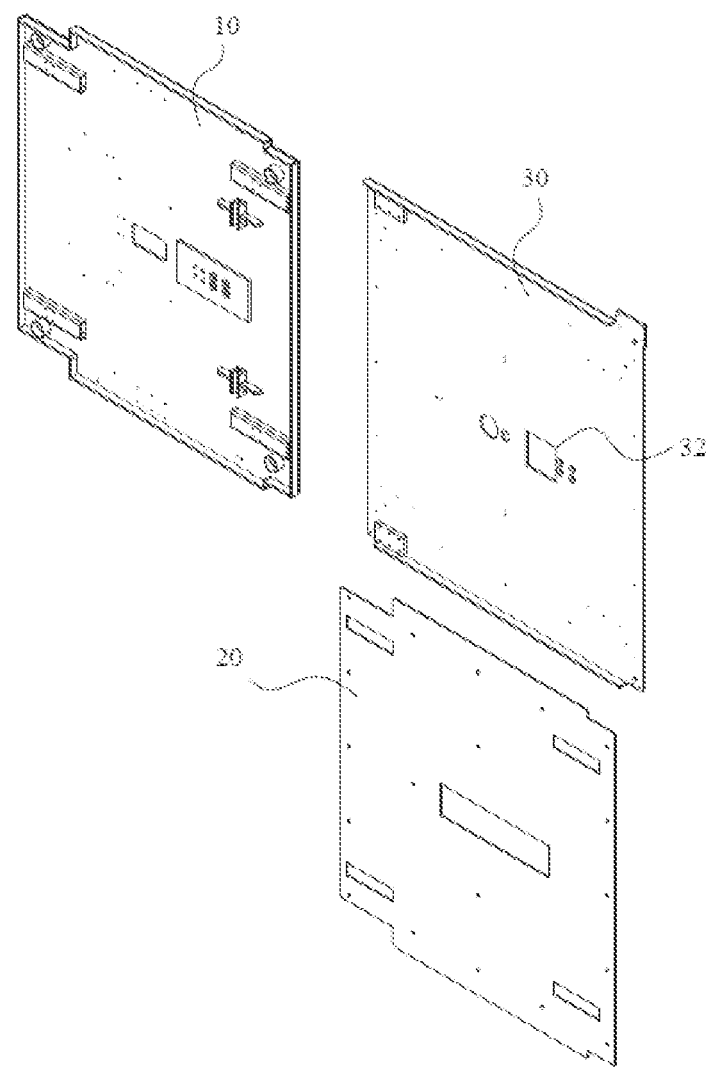
FIG. 12 is a schematic exploded view of FIG. 3.

As shown in FIG. 12, further, in an embodiment of the present invention, it is also possible to mount a slider 20 which reduces the frictional force when the upper board 10 is moved between the upper board 10 and the lower board 30. The sliding board 20 can be fixed to the lower board 30 as an intermediate layer to reduce the frictional force of the upper board 10 when it is moved. The sliding board has an escape hole through which the pushing board and the slide rail pass. Specifically, the sliding board 20 can be made of a Poly tetra fluoro ethylene sheet.

Embodiment 2

This embodiment is basically the same as Embodiment 1, except that the battery replacing device of this embodiment includes a mounting platform. The battery mounting portion is used to replace he battery located on the chassis of the electric vehicle, that is, to install and remove the battery, the tray is placed on the mounting platform of the battery mounting portion, and the battery is placed on the tray. When in use, the travel-driving portion drives the battery mounting portion to move under the chassis, and adjusts the distance between the battery mounting portion and the battery. The mounting platform is lifted to the bottom of the battery under the driving of the lifting portion, and unlocking the battery by the unlocking device mounted on the mounting platform, and the unlocked battery falls on the installation platform, that is, the battery is removed. During the installation, the battery mounting portion transports the battery on the mounting platform to the bottom of the chassis. After the mounting platform drives the battery up to bring the battery into the locked position of the vehicle, the battery is mounted on the chassis.

Figure 13:
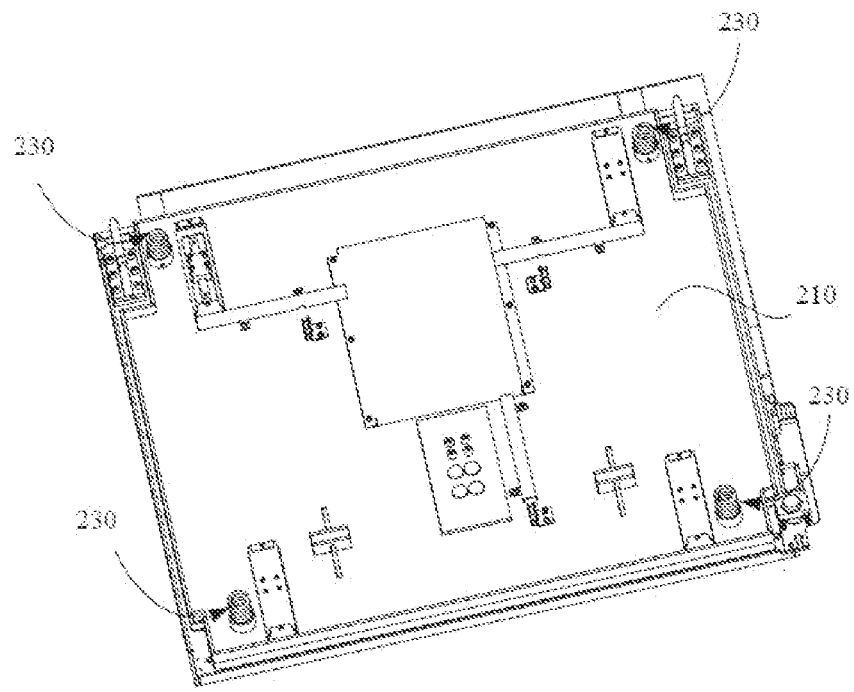
FIG. 13 is a partial schematic structural view of a mounting platform according to the embodiment 2 of the present invention, wherein the tray is removed.
Figure 14:
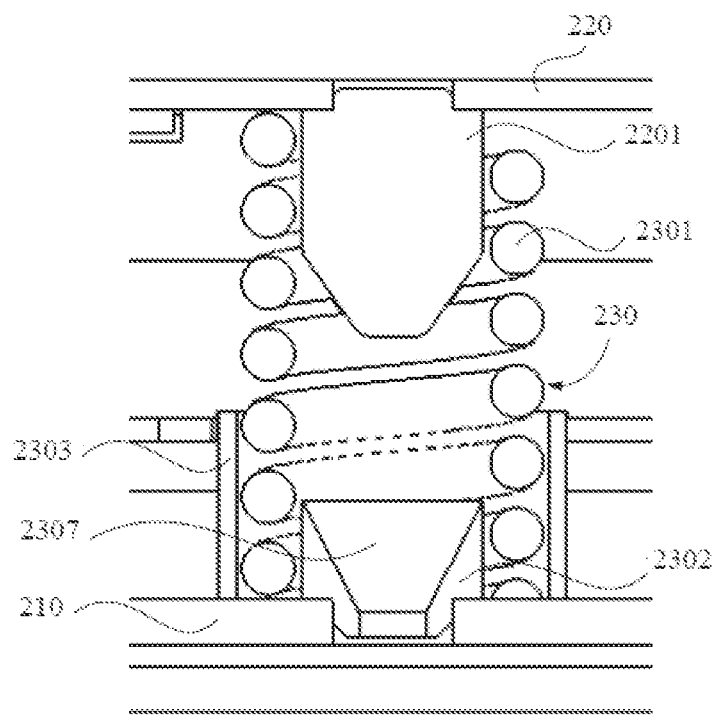
FIG. 14 is a schematic structural view of an elastic supporting assembly matching with a tray in a mounting platform according to the embodiment 2 of the present invention.
Figure 15:
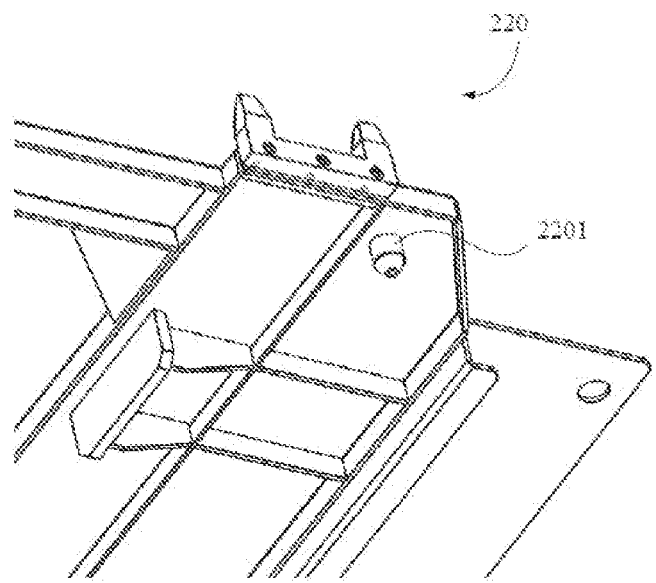
FIG. 15 is a schematic structural view of a tray in a mounting platform according to the embodiment 2 of the present invention.

As shown in FIGS. 13 and 14, the mounting platform includes a mounting board 210, a tray 220, and an elastic supporting assembly 230. Wherein, the elastic supporting assembly 230 is disposed on the mounting board 210. The elastic supporting assembly 230 supports a battery (not shown), and the elastic supporting assembly 230 is used to adjust the inclination of the battery relative to the mounting board 210, such that the battery is adapted to the chassis of the electric vehicle.

In the present embodiment, the battery is adapted to the chassis of the electric vehicle to improve the reliability of the battery replacing; in addition, the hard collision between the mounting platform and the battery is also reduced, thereby reducing stress concentration and not damaging the battery.

As shown in FIGS. 13 and 14, the mounting platform further includes a tray 220 supported on an elastic supporting assembly 230 for carrying the battery. Wherein, the elastic supporting assembly 230 is used to adjust the inclination of the tray 220 relative to the mounting board 10 to adapt the tray 220 to the chassis of the electric vehicle.

In the present embodiment, the battery can be further reduced in damage by the tray carrying the battery, and the reliability of the power can be further improved. Further, the contact between the tray and the battery portion can be reduced, and thus the stress concentration can be further reduced, and the damage to the battery can be further reduced.

As shown in FIGS. 13, 14, 16 and 17, the elastic supporting assembly 230 includes an elastic member 2301. The elastic member 2301 has a heading end and a trailing end along the longitudinal direction thereof. The heading end of the elastic member 2301 is disposed on the mounting board 210, and the trailing end of the elastic member 2301 is used for abutting against the tray 220. The elastic member can relatively reliably adjust the inclination of the mounting board relative position of the tray.

As shown in FIGS. 14 to 17, the bottom of the tray 220 has a positioning stud 2201, in which the inside of the elastic member 2301 is formed with a receiving cavity along the longitudinal direction of the elastic member 2301, and the two ends of the receiving cavity respectively extend to the heading end and the trailing end of the elastic member 2301, and the positioning stud 2201 is disposed at the trailing end of the elastic member 2301 to be located in the receiving cavity.

In the present embodiment, the positioning stud can restrict the movement of the tray in a direction perpendicular to the longitudinal direction of the elastic member, and the tray can be supported more reliably above the elastic member by the positioning stud. When there is no battery on the tray, the tray is supported on the elastic member by the positioning stud; when there is a battery on the tray, the tray compresses the elastic member, so that the positioning stud further extends into the receiving cavity.

As shown in FIGS. 14 to 17, the elastic supporting assembly 230 further includes a positioning member 2302 disposed on the mounting board 210 and located in the receiving cavity, and the positioning member 2302 is adapted to the positioning stud 2201 of the tray 220. The tray is positioned by the cooperation of the positioning member and the positioning stud, so that the tray can be reliably supported above the elastic component, which is beneficial to improve the reliability of the battery replacement.

Figure 17:
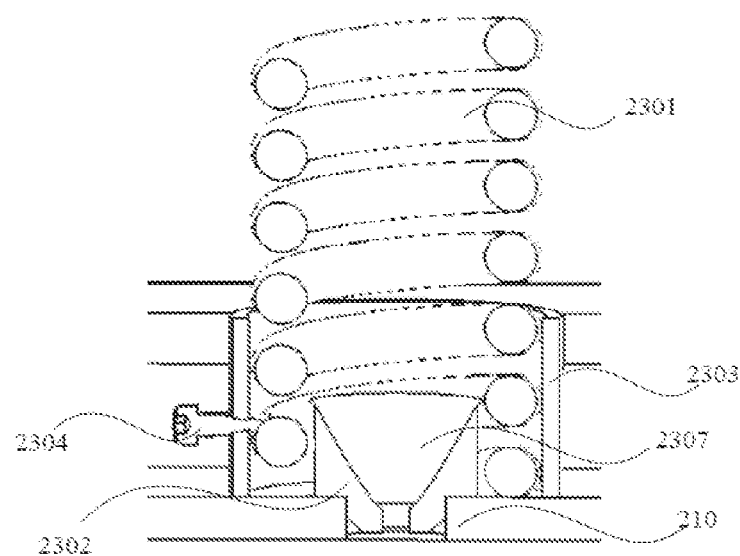
FIG. 17 is a schematic view showing a connection structure of an elastic supporting assembly and a mounting board in a mounting platform according to the embodiment 2 of the present invention.
Figure 18:
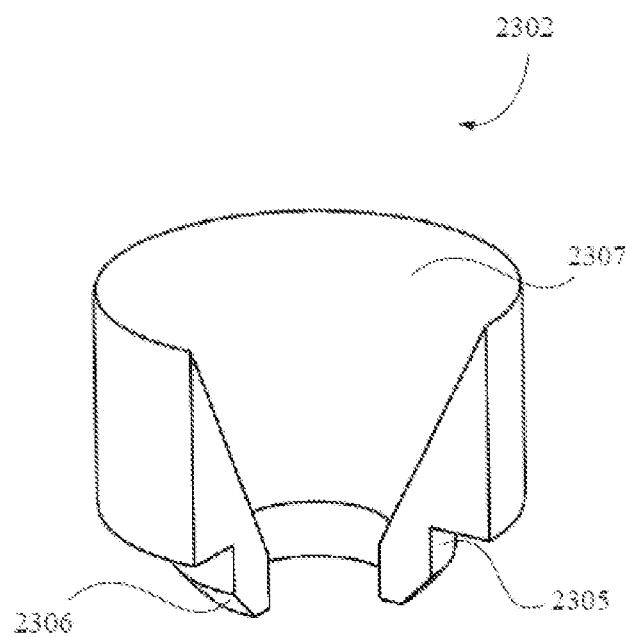
FIG. 18 is a schematic structural view of a positioning member in a mounting platform according to the embodiment 2 of the present invention.

In addition, as shown in FIG. 14, FIG. 17 and FIG. 18, the mounting board 210 is provided with a positioning groove. The bottom of the positioning member 2302 is embedded in the positioning groove. The bottom of the positioning member 2302 is formed with a recess portion 2305 along the circumferential direction thereof, and the recess portion 2305 is embedded in the positioning groove. The recessed portion 2305 is formed with a chamfered surface 2306 circumferentially adjacent to one end of the mounting board 210, the positioning groove having a positioning surface adapted to the chamfered surface 2306. It should be noted that the positioning element shown in FIG. 18 has a structure with an opening, but it is merely illustrative. In essence, in the present embodiment, the positioning element is closed.

In the present embodiment, the bottom of the positioning element 2302 is soldered to the mounting board 210. In other alternative embodiments, other connections, such as welded connections, may be employed between the bottom of the positioning element 2302 and the mounting board 210, and are not limited to the welded connections in this embodiment.

As shown in FIG. 14 and FIG. 16 to FIG. 18, the top of the positioning member 2302 is provided with a receiving groove 2307, and the receiving groove 2307 is engaged with the positioning stud 2201 of the tray 220. The positioning stud is engaged in the receiving groove, the structure is simple, and the connection is reliable. In addition, the positioning stud does not additionally increase the height of the positioning member, or the height of the positioning member is increased little, and the height occupied in the receiving cavity is small, which facilitates a large range of compression of the elastic component, which is beneficial to further improve the reliability of battery replacing.

In the present embodiment, as shown in FIGS. 14 and 16 to 18, a gap larger than 0 is formed between the outer wall surface of the positioning member 2302 and the inner wall surface of the elastic member 2301. The existence of the gap makes it possible that the positioning element does not affect the compression or elongation of the elastic element during the battery replacing, and the reliability of the battery replacing can be further improved.

Figure 16:
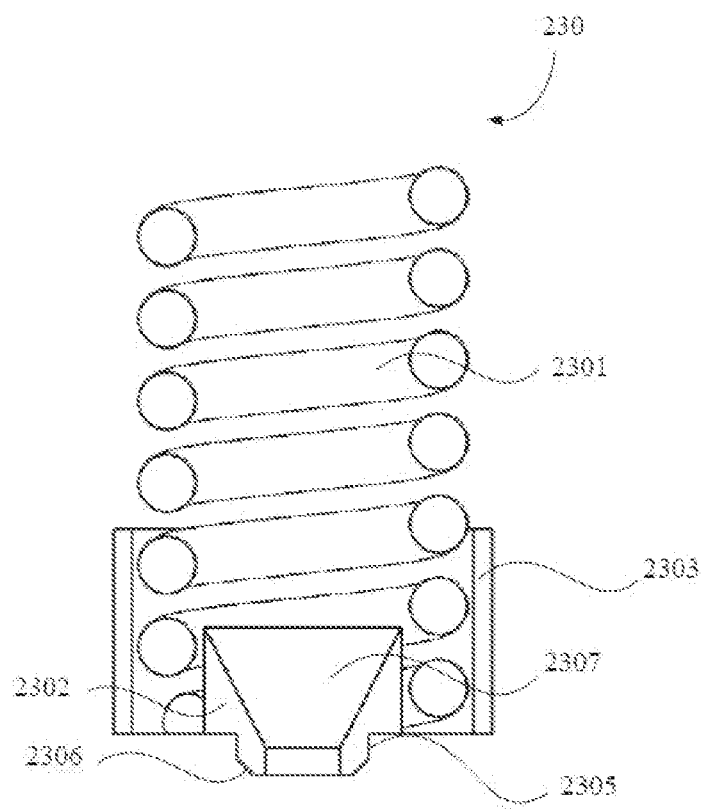
FIG. 16 is a schematic structural view of an elastic supporting assembly in a mounting platform according to the embodiment 2 of the present invention, wherein the penetrating member is removed.

In addition, in the embodiment, the elastic supporting assembly further includes a limiting member disposed on the mounting board for limiting the elastic component to be mounted to the mounting board. The reliability of the installation of the elastic component directly affects the reliability of the battery replacing, and the limiting component can improve the mounting reliability of the elastic component when to be mounted on the mounting board, thereby further improve the reliability of the battery replacing. As shown in FIG. 14, FIG. 16 and FIG. 17, the limiting member includes a protecting sleeve 2303 and a penetrating member 2304. The protecting sleeve 2303 is disposed on the mounting board 210 and covered on the heading end of the elastic member 2301, and the end of the penetrating member 2304 passes through the protecting sleeve 2303 and the heading end of the elastic member 2301.

Wherein, the protecting sleeve can define the movement of the elastic member along the circumferential direction thereof, and the penetration member can prevent the elastic member from being ejected from the mounting board or being taken out by the tray, so that improve the reliability when mounting the elastic member to the mounting board by the cooperation of the protecting sleeve and the penetration member, and further improves the reliability of the battery replacing.

In the present embodiment, the penetrating member should be as close as possible to the heading end of the elastic member on the premise of "preventing the elastic member from being ejected from the mounting board or being carried out by the tray", so that the elastic member has a large variation range of length. Further, in the present embodiment, the elastic member is a spring, the penetrating member is a screw, and the number of the penetrating members is one. In other alternative embodiments, the penetration member may be formed by other configurations, such as locating pins, and the number of penetration members may be set to two or more as desired.

As shown in FIG. 17, the end of the penetration 2304 is located outside of the positioning element 2302. The penetration member does not protrude into the positioning member to affect the cooperation of the positioning stud of the tray and the positioning member, thereby facilitating a further improvement of the reliability of the battery replacing.

As shown in FIG. 13, the number of the elastic supporting assemblies 230 is four, and the two of the elastic supporting assemblies 230 are the front elastic supporting assemblies for the front direction of the electric vehicle, and the other two elastic supporting assemblies 230 are the rear elastic supporting assembly for a rear direction corresponding to the electric vehicle; a height of the front elastic supporting assembly being lower than a height of the rear elastic supporting assembly, and the front elastic supporting assembly and the difference in height between the rear elastic supporting assembly is adapted to fit the chassis of the electric vehicle.

In addition, it should be noted that, in the present embodiment, the tray supported on the four elastic supporting assemblies is a unitary structure. In other alternative embodiments, the trays mounted on the four elastic supporting assemblies can also be disposed as independent structures, that is, each of the elastic supporting assemblies is correspondingly provided with a tray. In other alternative embodiments, the trays on the two front elastic supporting assemblies can also be provided as one piece and the trays on the two rear elastic supporting assemblies can be arranged in one piece. Accordingly, in other alternative embodiments, the front elastic supporting assembly and the rear elastic supporting assembly on the same side may also be provided as one piece.

In the present embodiment, the height difference between the front elastic supporting assembly and the rear elastic supporting assembly is adapted to the chassis of the electric vehicle, so that the each portions of the tray can be in contact with the battery as much as possible at the same time, and the reliability of the battery replacing can be improved. In addition, it is also possible to reduce or avoid a hard collision between the mounting platform and the battery, and the tray can basically achieve full-area contact with the battery, which can reduce or avoid stress concentration, thereby reducing damage to the battery.

Embodiment 3

The quick replacing system of the present embodiment is substantially the same as the quick replacing system 100 shown in FIG. 1 of Embodiment 1, and generally includes a battery holder 101 for arranging the battery 104, a palletizer 102, and a movable battery replacing platform 103.

The battery 104 placed in the battery holder 101 includes a replacement battery for the electric vehicle 105, and a rechargeable battery to be replaced by the electric vehicle 105. The battery holder 101 is provided with a plurality of placement layers formed by frames.

The movable battery replacing platform 103 is configured to remove and transporting the battery to be charged on the electric vehicle 105 to the palletizer 102, while receiving the replaced battery from the palletizer 102 and mounting it on the electric vehicle 105; including a lifting device for traveling and lifting the battery 104, and a battery mounting portion mounted on the lifting device for automatically removing the battery to be charged on the electric vehicle 105 or automatically mounting the replacement battery to the electric vehicle 105.

The palletizer 102 is used to place the battery to be charged which is replaced from the movable battery replacing platform 103 on the battery holder 101, and meanwhile, used to take the replaced battery out from the battery holder 101 for placing on the movable battery replacing platform 103. The palletizer 102 realize a movement in a horizontal and vertical direction relative to the battery 101 by the rail, which includes a stretchable frame for taking or placing the battery 104.

In operation, the battery holder 101, the palletizer 102 and the movable battery replacing platform 103 constitute a complete electric vehicle automatic battery quick replacing system, which can realize the assembly line quick replacing operation for a plurality of electric vehicles. When replacing, as long as the electric vehicle stops at the designated position, the battery can be automatically replaced within five to ten minutes. The entire replacement process does not require manual intervention, which reduces labor intensity and greatly improves replacement efficiency.

The movable battery replacing platform of this embodiment is basically the same as the movable battery replacing platform 103 shown in embodiment 1 and 2, which generally includes a lifting portion 107, a battery mounting portion 108, and a travel-driving portion 106.

The travel-driving portion 106 is used to drive the movement of the entire device during the pick-and-place process and replacement of the battery 104. The specific driving method may be any existing hoisting drive, rack and winching drive, roller drive or track drive, etc., which can realize the movement of the movable battery replacing platform 103.

The lifting portion 107 is mounted on the travel-driving portion 106 for realizing the lifting control of the battery 104 at the bottom of the electric vehicle 105 during the process of replacing the battery 104, including a lifting device 1071 that can be vertically moved ascend and descend, and the lifting driving portion 1072 that drives the lifting device 1071 to ascend and descend. The specific lifting device 1071 may be any existing structure capable of stretching in the vertical direction, such as a stretchable rod structure, a rail structure, a stretchable tube structure, or the like. The lifting driving portion 1072 may be a conventional power such as a hydraulic drive, an electric drive, or a pneumatic drive.

The battery mounting portion 108 is disposed at the top of the lifting device 1071 for placing a replacement battery or a replaced battery to be replaced. The upper surface of the battery mounting portion 108 is mounted with an unlocking device, which is used for unlocking the battery locking device on the electric vehicle under the control of the corresponding driving device, which realize the disassembling and the locking automatically to the battery 104 on the electric vehicle 105.

The movable battery replacing platform 103 of the present embodiment moves to the bottom of the electric vehicle 105 under the control of the travel-driving portion 106, and the lifting driving portion 1072 drives the lifting device 1071 to ascend, such that the unlocking device on the battery mounting portion 108 contact with the battery locking device at the bottom of the electric vehicle 105 in the battery mounting seat, in order to be in a unlocking state for the battery to be charged, and then controlling the battery mounting portion 108 to move in the horizontal direction to disengage the unlocked battery from the electric vehicle and directly drop on the battery mounting portion 108; the lifting device 1071 is controlled to descend by the lifting driving portion 1072, and the travel-driving portion 106 is driven to move to the battery holder 101 by the travel-driving portion 106, and the battery to be charged is removed by the palletizer 102, at the same time, the replacement battery is replaced; the travel-driving portion 106 drives the movable battery replacing platform 103 to move back to the lower side of the electric vehicle 105, and the lifting device 1071 drives the lifting device 1071 to ascend, so that the battery mounting portion 108 stuck the replacement battery into the battery mounting seating of the electric vehicle 105, the battery mounting portion 108 is then translated to lock the replacement battery in the battery mounting seating, and then the lifting driving portion 1072 is descend by the lifting device 1071; and quick replacing process by the travel-driving portion 106 moves the platform 103 for the battery out of the bottom of the electric vehicle 105, thus achieving an entire replacing battery process for an electric vehicle 105 automatically.

Figure 19:
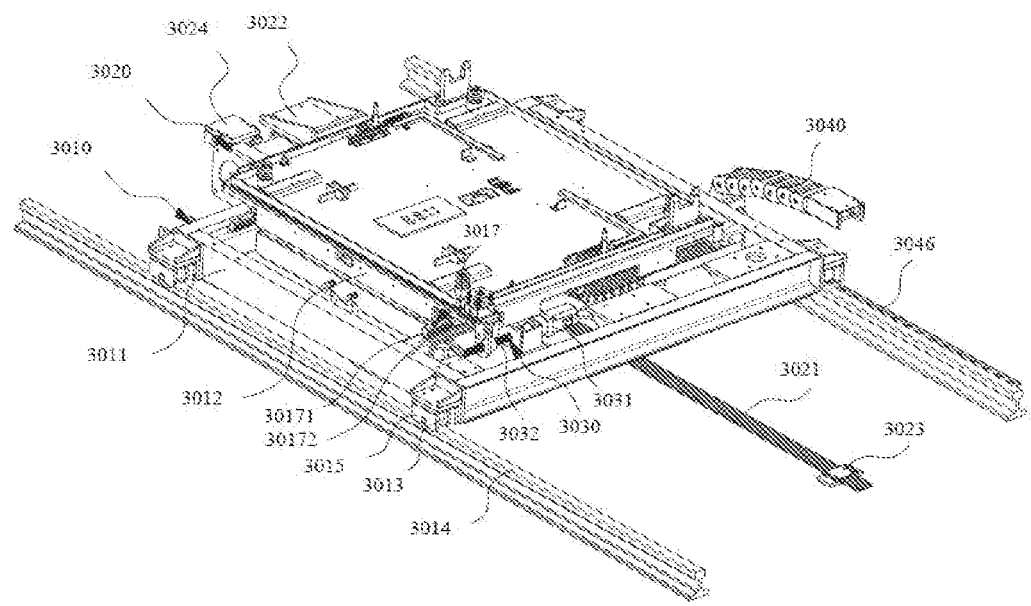
FIG. 19 is a schematic structural view of a travel-driving portion according to an embodiment of the embodiment 3 of the present invention.

As shown in FIG. 19, the travel-driving portion of one embodiment of the present invention generally includes a movable device 3010 and a synchronous drive device 3020.

The movable device 3010 includes a chassis 3011 for moving and supporting.

The synchronous driving device 3020 includes a synchronous belt 3021 fixed along the traveling path of the chassis 3011 with a radial rack or a tooth groove, and a clamping device 3022 that is engaged with the synchronous belt 3021 and fixed to the chassis 3011, and the fixing seat of synchronous belt, the two ends of the synchronous belt 3021 are respectively installed inside the fixing seat of the synchronous belt, and the clamping device 3022 is used for driving the chassis 3011 to horizontally move along the extending path of the synchronous belt 3021.

In operation, the chassis 3011 is placed on the extended path of the synchronous belt 3021 and is in contact with the synchronous belt 3021 by the clamping device 3022. The clamping device 3022 has a driving wheel meshed with the synchronous belt 3021, and the clamping device 3022 drives the driving. When the wheel rotates, the synchronous belt does not move, and the entire chassis 3011 is driven to advance along the synchronous belt 3021 by the meshing force of the clamping device 3022 and the rack of the synchronous belt 3021.

In addition, a mounting bracket 3012 may be provided on the chassis 3011, and a device for replacing the battery may be mounted on the mounting bracket 3012.

In one embodiment of the present invention, the movable device 3010 may further include two rails 3014 mounted in parallel with the synchronous belt 3021, and the chassis 3011 is horizontally moved along the rails 3014 by scroll wheel s 3013 mounted on the bottom of the chassis. The load of the synchronous driving device 3020 can be alleviated by the cooperation of the scroll wheel 3013 and the rail 3014.

Figure 21:
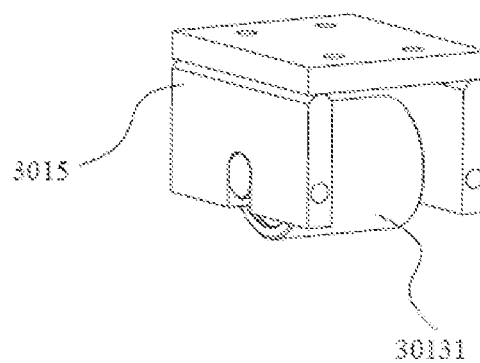
FIG. 21 is a schematic structural view of a load bearing wheel according to an embodiment of the embodiment 3 of the present invention.
Figure 22:
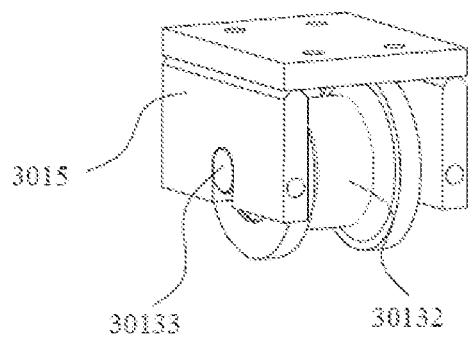
FIG. 22 is a schematic structural view of a guide wheel according to an embodiment of the embodiment 3 of the present invention.

As shown in FIGS. 21 and 22, in one embodiment of the present invention, the scroll wheel 3013 may specifically, include a cylindrical load bearing wheel 30131 on the same side of the chassis 3011, and a guide wheel 30132 with a convex circle on the other side of the chassis 3011. The guide wheel 30132 is caught on the rail 3014 by the slot of its outer surface, and restricts the prescribed route of the chassis 3011 from the track 3014 or the synchronous belt 3021. The load bearing wheel 30131 and the guide wheel 30132 can be mounted on a U-shaped fixing seat 3015 by an axis 30133 passing through the shaft center, and the fixing seat 3015 is fixed to the chassis 3011.

Figure 20:
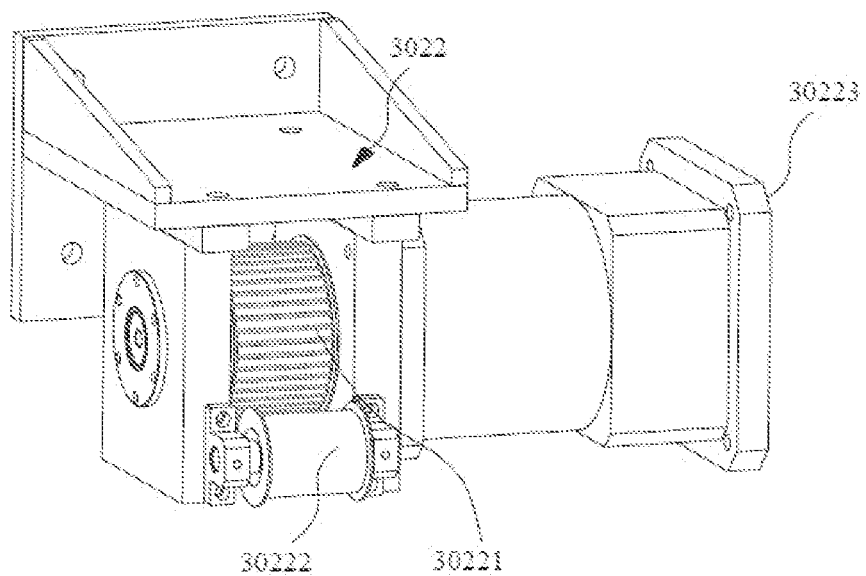
FIG. 20 is a schematic structural view of a clamping device according to an embodiment of the embodiment 3 of the present invention.

As shown in FIG. 20, in one embodiment of the present invention, the clamping device 3022 of the synchronous driving device 3020 may include a synchronous pulley 30221 having a radial rack on the outer circumferential surface, and the synchronous pulley 30221 is mounted through the supporting seat. On one side of the chassis 3011, two transiting wheels 30222 are further mounted on the supporting seat. The two transiting wheels 30222 are respectively located on both sides of the synchronous pulley 30221 in the direction of rotation of the synchronous pulley 30221 to clamp the synchronous belt 3021 on the outer circumference of the synchronous pulley 30221. In addition, the clamping device 3022 further includes a motor 30223 for driving the rotation of the synchronous pulley 30221. In operation, the motor 30223 drives the synchronous pulley to rotate axially. By the engagement force with the synchronous belt 3021, the synchronous pulley moves in the direction of the synchronous belt 3021, and drives the horizontal movement of the chassis, and the two transiting wheels 30222 are respectively located in the synchronous belt, and the synchronous belt 3021 is clamped from the other side, and the synchronous belt 3021 is defined on the outer circumferential surface of the synchronous pulley 30221, thereby increasing the contact area of the synchronous belt 3021 and the synchronous pulley 30221, and improving the meshing force during driving. Further, a speed reducer may be mounted between the motor 30223 and the synchronous pulley 30221.

Figure 23:
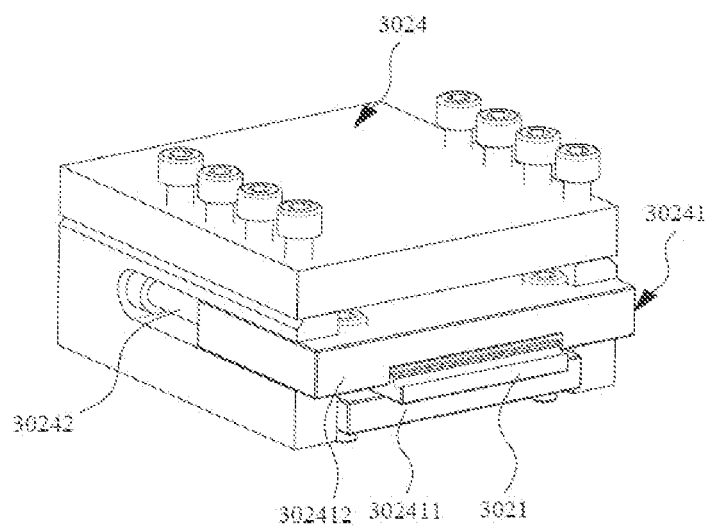
FIG. 23 is a schematic structural view of the second fixing seating according to an embodiment of the embodiment 3 of the present invention.

As shown in FIG. 23, in an embodiment of the present invention, the synchronous driving device 3020 may further include a first synchronization seat 3023 and a second synchronization seat 3024 that fix the two ends of the synchronous belt 3021. An adjusting device for adjusting the tightness of the synchronous belt 3021 is mounted on the first synchronization seat 3023 and/or the second synchronization seat 3024. The adjusting device may include a clamping block 30241 that clamps the synchronous belt 3021, and an adjusting portion 30242 adjusting the horizontal position of the clamping block 30241. The adjusting portion 30242 is conveniently connected to the synchronous belt 3021 by the clamping block 30241, and the tightness of the synchronous belt 3021 can be controlled by the adjusting portion 30252 controlling the reciprocating movement of the clamping block 30241 in the extending direction of the synchronous belt.

Further, in an embodiment of the present invention, the clamping block 30241 may include a clamping board 302411 and a tooth holder 302412, respectively, and the clamping board 302411 and the tooth holder 302412 respectively clamp the synchronous belt from both sides of the synchronous belt, for further fixing the synchronous belt, a tooth groove corresponding to the rack of the synchronous belt 3021 may be provided on the contacting side of the tooth holder 302412 and the synchronous belt 3021. The clamping board 302411 and the tooth holder 302412 clamp the synchronous belt 3021 and then fix the two by bolts to form a stable fixing structure. The adjusting portion 30242 may include an adjusting bolt fixed to the first synchronous seat 3023 or the second synchronous seat 3024 through a screw hole. One end of the adjusting bolt is an adjusting end, and the other end is movably connected to the clamping block 30241. During the adjusting, screwing the bolt, and the bolt drives the clamping block 30241 to reciprocate horizontally in the extending direction of the synchronous belt.

Further, in an embodiment of the present invention, the travel-driving portion may further include a screw rod positioning device 3030, which may include screw device 3031 fixed on the chassis and a pushing board 3032 fixed to the mounting bracket 3012 and coupled to the lead screw of the screw device 3031. The screw device 3031 drives the screw to rotate by the driving portion, and the rotation of the screw rod can push the pushing board 3032 to horizontally move along the extending direction of the screw rod, thereby driving the mounting bracket 3012 fixed with the pushing board to move horizontally relative to the chassis 3011, and the moving direction of the mounting bracket 3012 is perpendicular to the horizontal moving direction of the chassis 3011. When the synchronous driving device drives the chassis and the mounting bracket to move to the battery position to be replaced at the bottom of the vehicle, the pushing board 3032 can be pushed by the screw device 3031, thereby controlling the position of the mounting bracket 3012 on the chassis 3011, vertically with the synchronous belt 3021, the position of the battery replacing device located above the mounting bracket can be further adjusted to align with the position of the battery, thereby improving the alignment accuracy of the battery replacing device.

Figure 24:
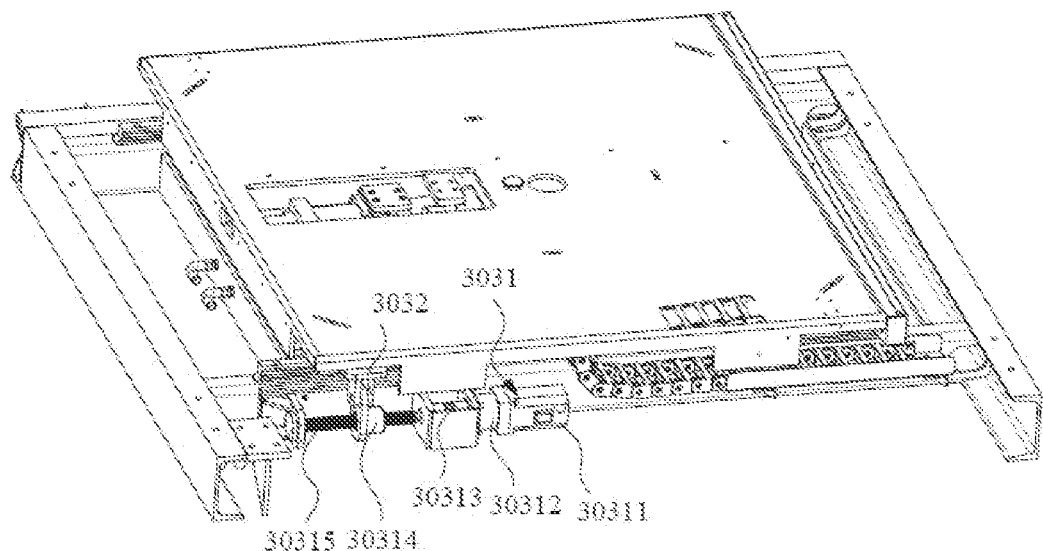
FIG. 24 is a schematic structural view of a screw rod positioning device according to an embodiment of the embodiment 3 of the present invention.

As shown in FIG. 24, in one embodiment of the present invention, the screw device 3031 of the screw rod positioning device 3030 may include a screw 30315 and a feeding motor 30311 for driving the screw 30315 to rotate, and a speed reducer 30312 mounted between the screw 30315 and the feeding motor 30311. During the operation, the feeding motor 30311 drives the screw 30315 to rotate through the speed reducer 30312, thereby achieving horizontal movement of the pushing board 3032. The pushing board 3032 can be directly connected to the screw 30315 through the threaded hole, or directly connected to the adjusting nut 30314 covered on the screw 30315. Further, a coupling 30313 may be installed between the speed reducer 30312 and the lead screw 30315.

In one embodiment of the present invention, a sliding device 3017 can be disposed between the chassis 3011 and the mounting bracket 3012 to increase flexibility when the mounting bracket 3012 moves relative to the chassis 3011. The sliding device 3017 may include a slide groove 30171 mounted on the chassis 3011, and a slider 30172 fixed to the mount bracket 3012 and stuck on the slide groove 30171. In other embodiments, the mounting positions of the sliding groove 30171 and the slider 30172 may be reversed.

Figure 25:
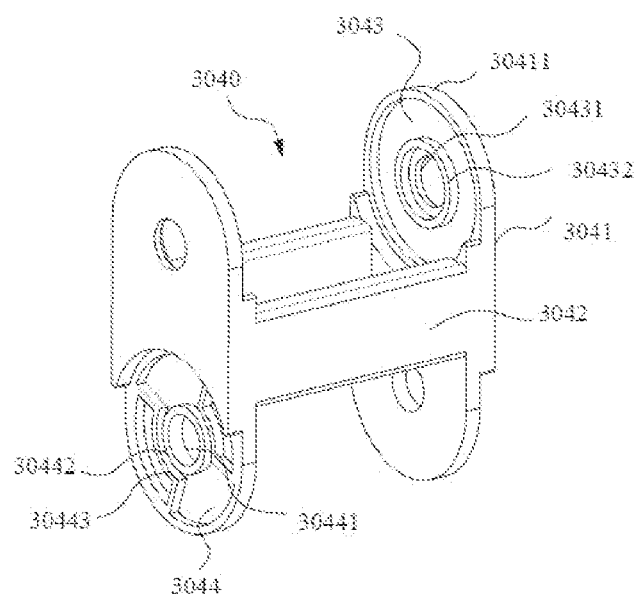
FIG. 25 is a schematic view of a towing chain device according to an embodiment of the embodiment 3 of the present invention.

As shown in FIG. 25, in one embodiment of the present invention, the travel-driving portion may further include a towing chain device respectively connected to the movable battery replacing platform and the fixing point, which generally includes a connecting member 3040 for binding and accommodating the cable, and a receiving groove 3046 that receives the connecting member 3040.

The connecting member 3040 includes two oppositely disposed connecting board 3041, and two spaced apart partition board 3042 that fix the two connecting board 3041 in parallel with each other; the plurality of connecting members 3040 are rotatably connected to each other by the connecting board 3041 to form a structure having a hollow passage.

The receiving groove is strip-shaped box with a top open for placing the interconnected connecting members 3040 to improve the cleanliness.

In the present embodiment, the connecting board 3041 and the partition board 3042 of each connecting member 3040 form an intermediate hollow passage. After the connecting members 3040 are connected by the connecting board 3041, each passages communicate with each other to form a cable for wearing. Since the accommodating tube has a movable connection between the connecting members 3040, the accommodating tube can be bent into any shape in one direction (axial direction), thereby facilitating the synchronous movement of the cable with the working device, and multiple cables can be tied by one accommodating tube to avoid cluttering the cables around the device. The connecting member 3040 can also withstand a certain amount of pressure to avoid damaging the internal cables. The receiving groove can restrict the connecting member 3040 from moving freely or being pressed at will after being connected, thereby improving the safety of the cable. The receiving groove is arranged in the moving direction of the connecting member 3040 during installation, so that the connecting member 3040 can be automatically placed into the receiving groove with the movement of the device, and can also be automatically pulled out from the receiving groove as the device moves.

Specifically, the connecting member 3040 can movably connect the connecting board 3041 of the two connecting members 3040 together by means of fasteners such as rivets. In addition, the width of the partition board 3042 in the passage direction may be set to different ones as needed, so that the interconnected connecting member 3040 expose internal cables or closed internal cables depending on the environment of use.

In an embodiment of the present invention, specifically, the connecting board 3041 may be provided with a connecting portion 30411 when the two ends thereof are connected to each other with the other connecting board 3041, for improving the connection strength after the connection, an engaging structure could be provided on the end of the connecting portions 30411 of the same connecting board 3041, and the engaging structure can make mutually rotating after the connecting board being connected to the other connecting board 3041. By the engaging structure, the connection effect of the two connecting members 3041 can be improved, and the rotational contact of the two is limited to a large range, thereby avoiding rapid wear deformation caused by the point connecting manner. The specific engaging structure may be any structure that can ensure that the two connecting members 3040 can rotate at any angle with the connecting point while dispersing the pressure of the connecting point. For example, a plurality of concentric circles of different diameters are respectively disposed on the two connecting boards 3041, and concentric circles on the two connecting boards 3041 may be nested with each other.

Further, in an embodiment of the present invention, in order to clean the appearance of the connecting member 3040 after being connected, the thickness of the connecting portion 30411 of the connecting board 3041 on each connecting member 3040 may be less than or equal to half the thickness of the body of the connecting board 3041, and the engaging structures of the connecting portions 30411 at both ends of the same connecting board 3041 are opposite in position. After the structure is adopted, the connecting portions 30411 of the two connecting board 3041 can be convexly and concavely connected when the two connecting board 3041 are connected to each other, so that the thickness of the two connecting portions 30411 is exactly the same as the thickness of the entire connecting board 3041, and thus the connecting member 3010 are generally identical in appearance after being connected. In addition, in order to facilitate the rotation of the connected connecting board 3041, the transition step between the connecting portion 30411 and the connecting board 3041 may be an arc corresponding to the shape of the end portion of the connecting portion 30411.

In an embodiment of the present invention, a specific engaging structure is provided, which may include an active engaging structure 3043 disposed at one end of the connecting board 3041, and a passive engaging structure 3044 disposed at the other end of the connecting board 3041. The active engaging structure 3043 may include a shaft hole 30431 extending through the end connecting portion 30411, and a limiting circle 30432 disposed outside the shaft hole 30431 and having an inner diameter larger than the diameter of the shaft hole 30431; and the passive engaging structure 3044 may also include a shaft hole 30441 through the end connecting portion 30411, and has a convex circle 30442 whose outer diameter is smaller than or equal to the inner diameter of the limiting circle 30432 at the edge of the shaft hole 30441.

During the installation, the connecting portions 30411 of the two connected connecting board 3041 are respectively provided with an active engaging structure 3043 and a passive engaging structure 3044. When being connected, the connecting board 3041 of the passive engaging structure 3044 is engaged with the active engaging by the convex circle 30442. In the limiting circle 30432 of the structure 3043, the two connecting members 3040 form a rotating structure with a convex circle 30442, a limiting circle 30432 and a rivet passing through the shaft holes 30431 and 30441 at the same time as a connecting point, thereby improving the connection strength of the piece 3040 of the two connections.

Further, in order to facilitate the mounting of the two connecting members 3040, in one embodiment of the present invention, the connecting portions 30411 of the same end of the two connecting board 3041 of the same connecting member 3040 are located on the same side. The structure can connect the active engaging structure 3043 of the two connecting members 3040 and the passive engaging structure 3044 directly from one side when the connecting member 3040 is connected to the other connecting member 3040.

In an embodiment of the present invention, the passive engaging structure 3044 may further include an arc-shaped clamping portion 30443 spaced apart from the outer side of the convex circle 30442. The arc-shaped clamping portion 30443 is provided with at least two, and each of the arc-shaped clamping portion 30443 is symmetrically arranged on the connecting portion 30411, when the two connecting members 3040 are connected, after the limiting circle 30432 is stuck on the convex circle 30442, and the clamping portion 30443 can be fixed by the outer side of the limiting circle 30432, and the structure can further improve the strength of the two connecting members 3040 after being connected. Further, the arc-shaped clamping portion 30443 has a structure protruding from the surface of the connecting portion body, and the strength of the connecting portion 30411 can also be improved. The specific arc-shaped clamping portion 30443 may be a separate curved line segment or a closed convex structure with a curved segment shape.

Figure 26:
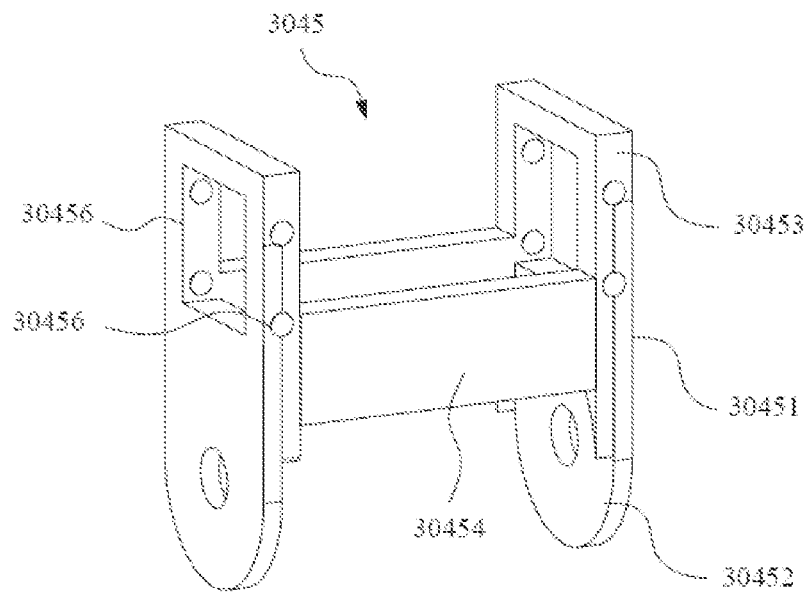
FIG. 26 is a schematic structural view of a connector according to an embodiment of embodiment 3 of the present invention.

As shown in FIG. 26, in an embodiment of the present invention, in order to facilitate the fixing of the entire connected connecting member 3040, the connecting member 3040 may further include a connector 3045 fixed to the connection point, and the basic shape are identical for the connector 3045 and the connecting member 3040. The shape includes two oppositely disposed fixing boards 30451, and two spaced apart partition boards 30454 that fix the two fixing boards 30451 in parallel with each other; one end of the fixing board 30451 is a connection portion connected with the connecting portion 30411 of the connecting member 3040, and the other end is a fixed end 30453 that cooperates with the fixing point. When in use, a connector 3045 can be respectively connected to two ends of the plurality of interconnecting connecting member 3040. One connector 3045 is fixed to the fixing structure of the fixing point by the fixing end 30453, and is connected to the connecting member 3040 through the connecting portion 30452. The other connector 3045 is fixed to the device by the fixed end 30453, and the connecting portion 30452 is connected to the connecting member 3040. The connected connecting member 3040 can be moved by the two connectors 3045 after being connected.

Further, the fixed end 30453 may have a rectangular shape, and a through-hole 30455 such as a rectangular hole or a circular hole is disposed on the fixed end 30453, and a fixing hole communicating with the through-hole 30455 is disposed at a side of the through-hole 30455. During the installation, the fixing member of the fixing point protrudes into the through the hole 30455, and the fixing member is defined in the through-hole 30455 by the screw passing through the fixing hole 30456, thereby forming the connector 3045 in a stable connection relationship with the fixing point. Specifically, the fixing member may be a fixing rod that penetrates through the through-hole 30455 of the two fixing ends 30453 of one connector 3045 at the same time.

Embodiment 4

The quick replacing system of this embodiment is substantially the same as the quick replacing system 100 shown in FIG. 1 of Embodiment 1, and generally includes a battery holder 101, a palletizer 102, and a movable battery replacing platform 103.

The battery holder 101 is used for replacing the battery for the electric vehicle 105 and a rechargeable battery to be replaced from the electric vehicle 105, which includes a plurality of placement layers formed by frames.

The movable battery replacing platform 103 is configured to remove and transport the battery to be charged on the electric vehicle 105 to the palletizer 102, while receiving the replacement battery 104 from the palletizer 102 and mounting it on the electric vehicle 105; including a lifting device for traveling and lifting the battery 104, and a battery mounting portion mounted on the lifting device for automatically removing the battery to be charged on the electric vehicle 105 or automatically mounting the replacement battery to the electric vehicle 105.

The palletizer 102 is for placing the replacement battery to be replaced of the movable battery replacing platform 103 in the battery holder 101, and at the same time, removing the replacement battery from the battery holder 101 to the movable battery replacing platform 103; the palletizer 102 performs a movement in the horizontal and vertical directions relative to the battery holder 101 by the tracks, which includes an extendable telescoping bracket for picking up and descending the battery 104.

During the operation, the battery holder 101, the palletizer 102 and the movable battery replacing platform 103 constitute a complete electric vehicle automatic battery quick replacing system, which can realize the assembly line quick replacing operation for a plurality of electric vehicles. When replacing, as long as the electric vehicle stops at the designated position, the battery can be automatically replaced within five to ten minutes. The entire replacement process does not require manual intervention, which reduces labor intensity and greatly improves replacement efficiency.

Figure 27:
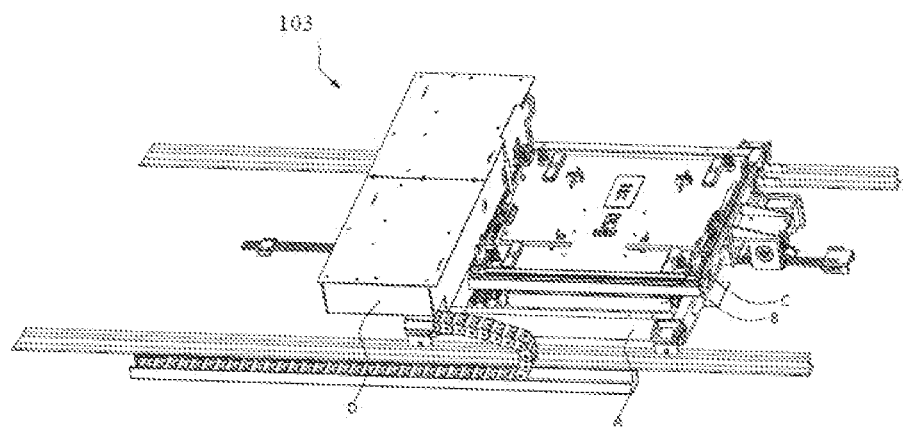
FIG. 27 is a schematic structural diagram of a movable battery replacing platform according to an embodiment of the embodiment 4 of the present invention.

As shown in FIG. 27, the movable battery replacing platform according to an embodiment of the present invention generally includes a horizontal moving portion A that drives the movable battery replacing platform 103 to move horizontally, a vertical lifting portion B that provides a lifting function, the battery mounting portion C to make unlocking and installation for the battery and the power portion D that provide power for the operation of each component.

The horizontal moving portion A is used to drive the movement of the process of pick-and-place and replacement for battery of movable battery replacing platform 103, including a movable frame A10 for moving and providing the mounting seat, and a horizontal driving device fixing along the line for replacing the battery to drive the movement of the movable frame A10.

The vertical lifting portion B is mounted on the horizontal moving portion A for lifting in the vertical direction to facilitate battery replacement, including the scissor lifting mechanism mounted on the movable frame A10 and a lifting driving device driving the scissor lifting mechanism.

The battery mounting portion C is disposed at the top of the vertical lifting portion B for placing the battery to be replaced or the replaced battery, and simultaneously disassembling and installing the battery on the electric vehicle under the control of the control unit; A battery replacing platform at an upper end of the lifting mechanism, the battery replacing platform including an upper board C10, and an unlocking device C50 for unlocking a battery mounted on the electric vehicle and in a locked state.

The power portion D is mounted on the movable frame A10 for providing power and control when each device is in operation.

During the operation, the movable battery replacing platform 103 moves to the bottom of the electric vehicle under the control of the horizontal moving portion A, and drives the scissor lifting mechanism to rise by the lift driving device to bring the battery mounting portion C into contact with the battery to be replaced on the electric vehicle. Then, the unlocking device C50 is used to unlock the battery in a locked state, so that the unlocked battery to be replaced directly falls on the upper board C10; then the lifting device is controlled to descend by the lifting driving device, and the driving is driven by the horizontal driving device A20. The movable frame A10 is moved to the battery holder 101, and the battery to be replaced is removed by the palletizer 102, and the new battery is replaced; the horizontal driving device A20 drives the movable frame A10 to move under the electric vehicle 105, and drives the upper board by using the scissor lifting mechanism. The C10 is raised by the scissor lifting mechanism so that the upper battery is caught in the battery mount of the electric vehicle 105 and automatically locked. Then, the lift driving mechanism controls the scissor lifting mechanism to descend, and then the horizontal driving device C20 drives the movable frame A10 to move out of the bottom of the electric vehicle 105 and returns to the standby position, thereby completing the automatic battery quick replacing process of an electric vehicle 105.

Figure 28:
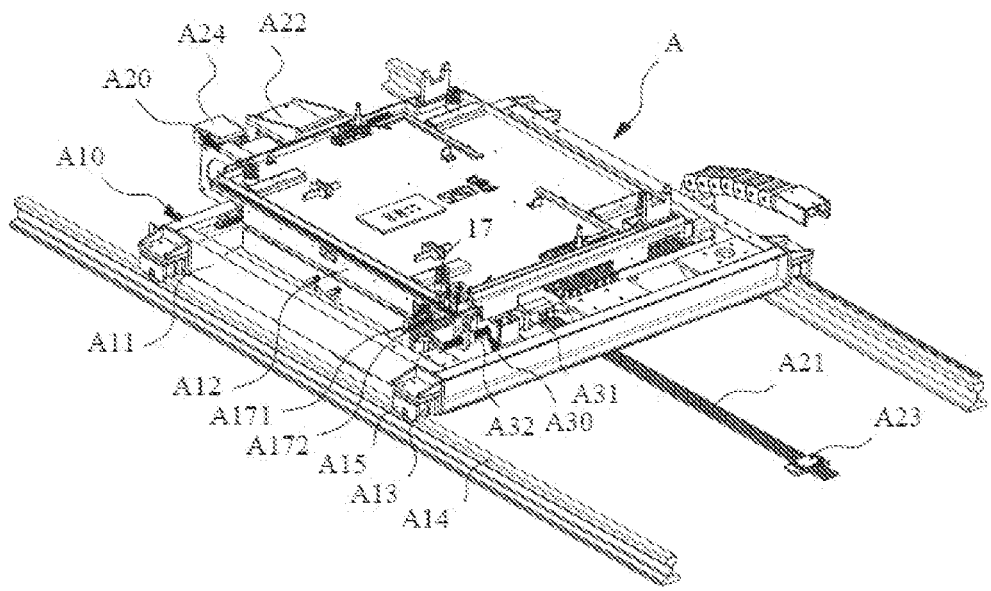
FIG. 28 is a schematic structural diagram of a travel-driving portion according to an embodiment of the embodiment 4 of the present invention.

As shown in FIG. 28, in one embodiment of the present invention, the horizontal driving device A20 includes a synchronous belt A21 with a radial rack, and a clamping driving device A22 that meshes with the synchronous belt A21 and is fixed to the chassis A12.

The movable frame A10 can adopt a rectangular frame structure as a base for mounting the components, the synchronous belt A21 is arranged along the replacement circuit line, both ends of the synchronous belt are fixedly mounted by the fixing seat, and the clamping driving device A22 is fixed on the movable frame A10, and it not only forms an engaging relationship with the synchronous belt A21 but also provides working power, and the rack on the synchronous belt A21 can prevent the synchronous belt A21 from sliding relative to the clamping driving device A22, so that the movement of the clamping driving device A22 can be synchronized. The engaging force of the belt A21 pushes the movable frame A10 to move along the synchronous belt A21, and achieves the purpose of controlling the movement of the movable frame A10 and stopping it at an arbitrary designated position.

It is also possible to provide a mounting bracket A11 on the movable frame A10, which is movably mounted on the movable frame A10 as a base for mounting the lifting portion.

Figure 29:
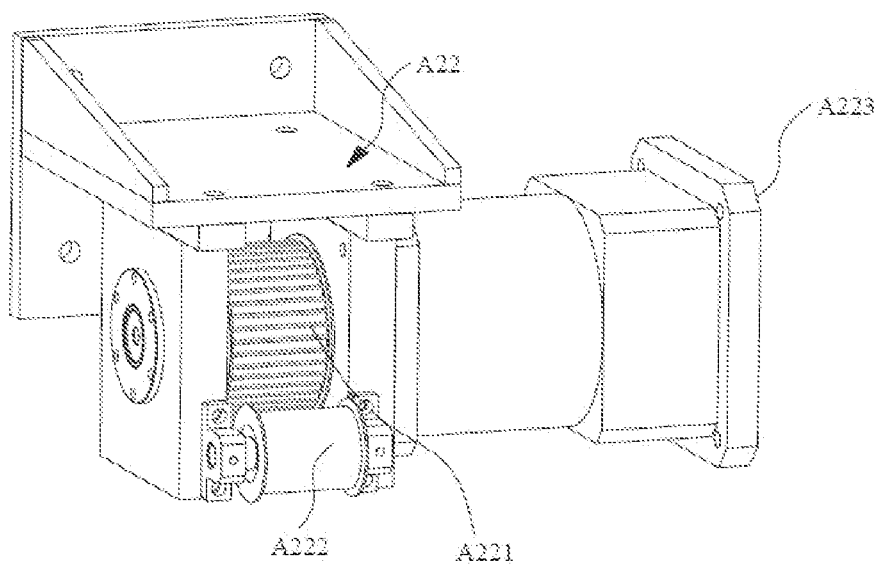
FIG. 29 is a schematic structural view of a clamping device according to an embodiment of the embodiment 4 of the present invention.

As shown in FIG. 29, in one embodiment of the present invention, the clamping driving device A22 may include a synchronous pulley A221 with a radial rack on the outer circumferential surface, and transiting wheel A222 respectively located on two sides on the opposite sides of the synchronous belt A221 to clamp the synchronous belt A21 on the outer circumference of the synchronous pulley A221, and the motor A223 that drives the synchronous pulley A221 to rotate. During the operation, the side of the synchronous belt A21 having the rack is attached to the outer circumference of the synchronous pulley A221, the rack on the synchronous belt A21 is engaged with the rack on the synchronous pulley A221, and the two transiting wheels A222 are located in the synchronous belt A21. On the other side, the synchronous belt A21 is defined on the outer circumferential surface of the synchronous pulley A221, thereby increasing the contact area of the synchronous belt A21 and the synchronous pulley A222, and thus improving the meshing force at the time of driving. Further, a speed reducer can also be installed between the motor A223 and the synchronous pulley A221. The clamping driving device A22 can be fixed to the movable frame A10 by a fixing seat.

In an embodiment of the present invention, a mounting bracket A11 is further mounted on the movable frame A10, and a screw rod positioning device for adjusting the relative position between the movable frame A10 and the mounting bracket A11 is installed. The screw rod positioning device includes the screw device A31 fixed to the movable frame A10 and perpendicular to the traveling direction of the movable frame A10, and a pushing board A32 fixed to the mounting bracket A12 and connected to the screw device A31. The movement of the screw device A31 can push the pushing board A32 to adjust the position of the mounting bracket A11 relative to the movable frame A10, which is adjusted in a direction perpendicular to the normal moving direction of the chassis A12.

Figure 33:
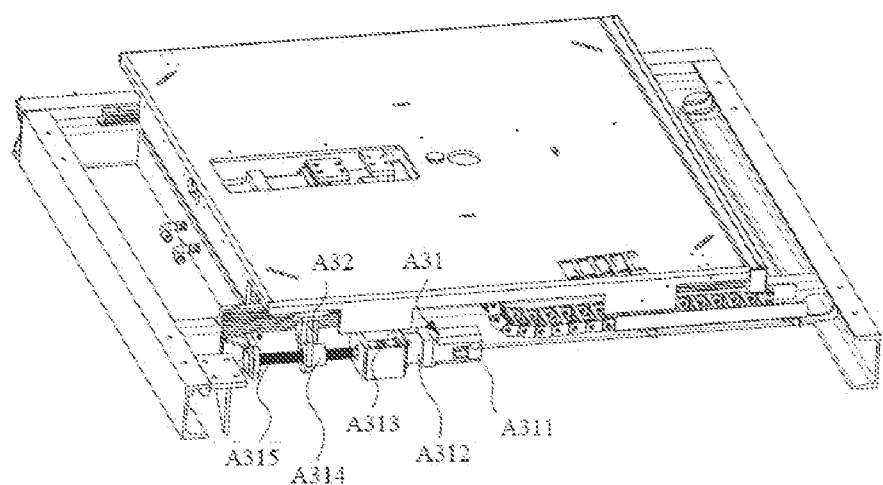
FIG. 33 is a schematic structural view of a screw rod positioning device according to an embodiment of the embodiment 4 of the present invention.

As shown in FIG. 33, in one embodiment of the present invention, the screw device A31 may include a screw A315 and a feeding motor A311 that drives the screw A315 to rotate, and a reducer A312 installed between the feeding motor A311 and the screw A315. During the operation, the feeding motor A311 drives the screw rod A315 to rotate by the speed reducer A312, thereby realizing the movement of the pushing board A32. The pushing board A32 can be directly connected to the screw A315 through the threaded hole, or directly connected to the adjusting nut A314 fitted on the screw A315. The entire screw rod positioning device can be fixed to the movable frame by a fixing seat. Further, a coupling A313 may be installed between the speed reducer A312 and the screw A315.

In one embodiment of the present invention, a sliding device A17 may be provided between the movable frame A10 and the mounting bracket A12 to improve the flexibility of the mounting bracket A11 relative to the movable frame A10. The sliding device A17 may include a slide groove A171 mounted on the movable frame A10, and a slider A172 fixed to the mounting bracket A11 and stuck on the slide groove A171. In other embodiments, the mounting positions of the sliding groove A171 and the slider A172 may be reversed.

In one embodiment of the present invention, the movable frame A10 may further include two tracks A14 installed in parallel with the synchronous belt A21, and the movable frame A10 is supported on the track A14 by scroll wheel s mounted on the bottom of the movable frame A10. The load of the synchronous driving device A20 can be alleviated by the cooperation of the scroll wheel A13 and the track A14.

Figure 30:
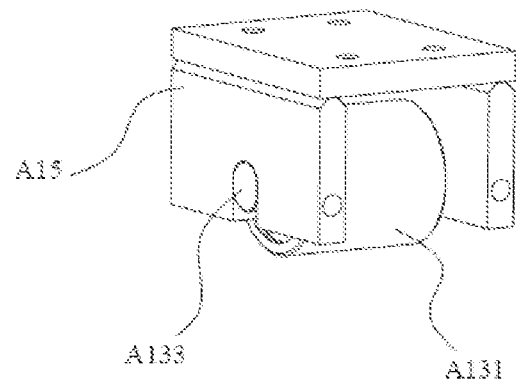
FIG. 30 is a schematic structural view of a load bearing wheel according to an embodiment of the embodiment 4 of the present invention.
Figure 31:
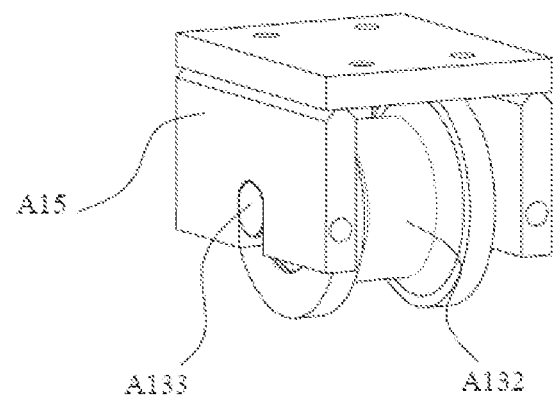
FIG. 31 is a schematic structural view of a guide wheel according to an embodiment of the embodiment 4 of the present invention.
Figure 32:
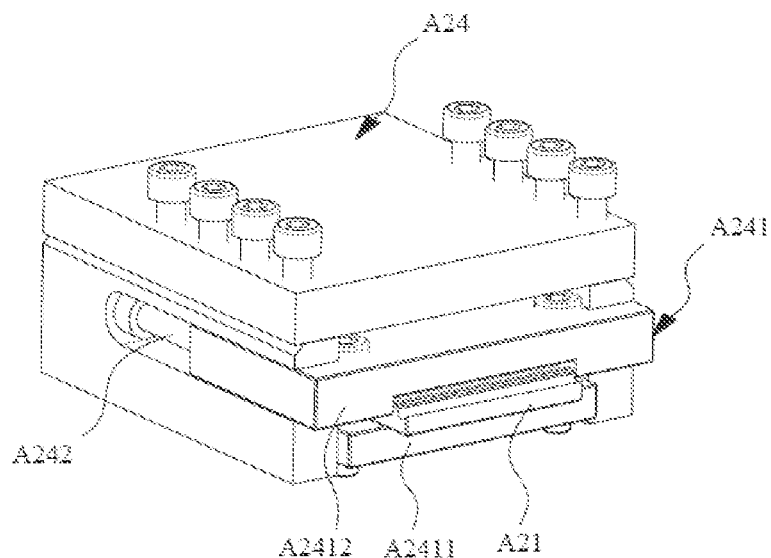
FIG. 32 is a schematic structural view of the second fixing seating according to an embodiment of the embodiment 4 of the present invention.

As shown in FIGS. 30 and 31, in one embodiment of the present invention, specifically, the scroll wheel A13 may include a cylindrical load bearing wheel A131 on the same side of the chassis A12, and guide wheel A132 with convex circle locating on the two ends of the other side of the chassis A12. The guide wheel A132 can be stuck on the track A14 and restrict the prescribed route from the track A14 or the synchronous belt A21 when the chassis A12 moves. The load bearing wheel A131 and the guide wheel A132 can be mounted on a U-shaped fixing seat A15 by a shaft A133 passing through the shaft center, and the fixing seat A15 is fixed to the chassis A12.

In an embodiment of the present invention, the horizontal driving device A20 may further include a first synchronization seat A23 fixing the two ends of the synchronous belt A21 and a second synchronization seat A24, respectively. An adjusting device for tightness is mounted on the first synchronous seat A23 and/or the second synchronous seat A24. As shown in FIG. 7, the adjusting device may include a clamping block A241 for holding the synchronous belt A21, and an adjusting portion A242 for adjusting the position of the clamping block A241 relative to the first synchronization seat A23 or the second synchronization. The clamping block A241 is movably mounted in the first synchronization seat A23 or the second synchronization seat A24 and connected to the adjusting portion A242. The adjusting portion A242 is conveniently connected to the synchronous belt A21 by the clamping block A241, and tightness of the synchronous belt A21 can be controlled by controlling the horizontal movement of the clamping block A241 in the direction in which the synchronous belt extends. Specifically, the first synchronous seat A23 and the second synchronous seat A24 may be fixed on the ground of the traveling path of the battery replacing device, and both ends of the synchronous belt are respectively fixed in the two synchronous seats, and the synchronous belt A21 is suspended on the ground.

Further, in an embodiment of the present invention, the clamping block A241 may include a clamping board A2411 and a tooth holder A2412 for clamping the synchronous belt from upper and lower sides of the synchronous belt, respectively, for better clamping and fixing of the synchronous belt, a tooth groove corresponding to the rack of the synchronous belt A21 can be provided in the side of the tooth holder A2412 that is in contact with the synchronous belt A21. The clamping board A2411 and the tooth holder A2412 clamp the synchronous belt A21 and then fix the two by bolts to form a stable fixing structure. The adjusting portion A242 may include an adjusting bolt fixed to the first synchronous seat A23 or the second synchronous seat A24 through a screw hole. One end of the adjusting bolt is an adjusting end, and is located outside the first synchronous seat A23 or the second synchronous seat A24. The other end is movably connected to the clamping block A241. When adjusting, the clamping block A241 can be pulled toward or away from the first synchronous seat A23 or the second synchronous seat A24 by screwing the adjusting bolt.

Figure 34:
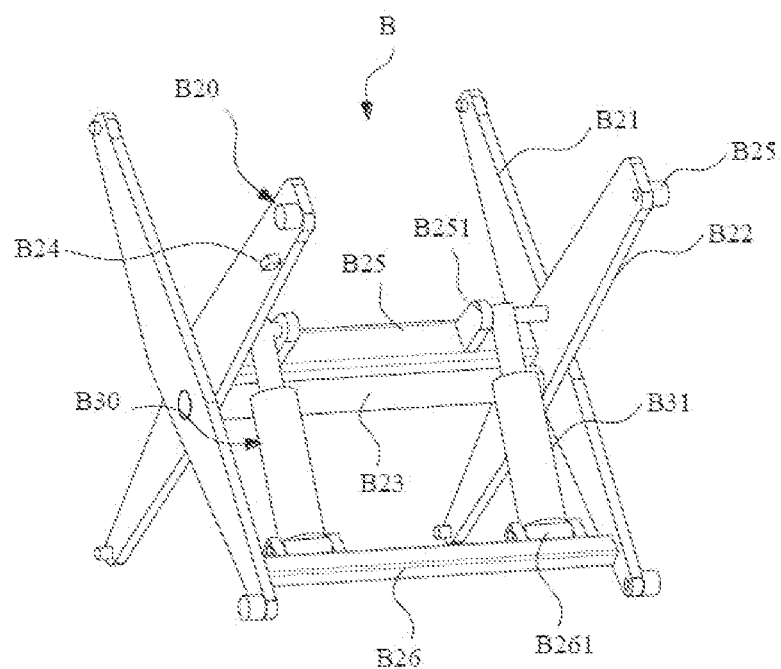
FIG. 34 is a schematic view of a scissor lifting mechanism according to an embodiment of the embodiment 4 of the present invention.

As shown in FIG. 34, one embodiment of the present invention discloses a vertical lifting portion B including a scissor lifting mechanism B20 and a lifting driving device B30. The scissor lifting mechanism B20 is configured to realize a lifting function in a vertical direction, so that the battery mounting portion C can reach the bottom of the electric vehicle 105 for the purpose of battery installation or disassembly, and the driving output end of the lifting driving device and the scissor lifting are connected to drive the lifting mechanism to rise and fall in a vertical direction, and the scissor lifting mechanism B20 includes a lifting board for mounting the battery mounting portion C.

Figure 35:
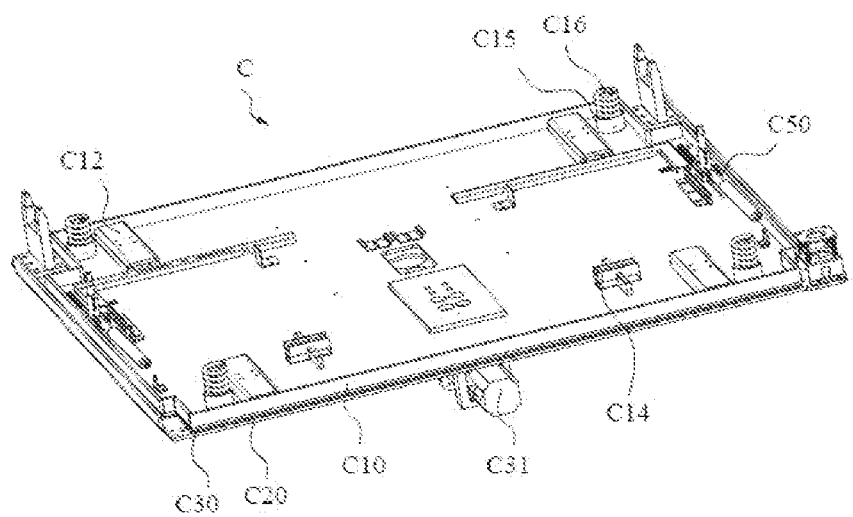
FIG. 35 is a schematic structural view of a battery mounting portion according to an embodiment of the embodiment 4 of the present invention.

As shown in FIG. 35, in an embodiment of the present invention, the battery mounting portion C includes a battery replacing platform, and the battery replacing platform includes an upper board C10 and an unlocking device mounted on an upper surface of the upper board C10, wherein the upper board C10 is a plain surface. The shape of the upper board C10 is plain and is mounted on the upper surface of the lifting board, and a moving drive device C31 is also mounted on the upper board C10.

Figure 38:
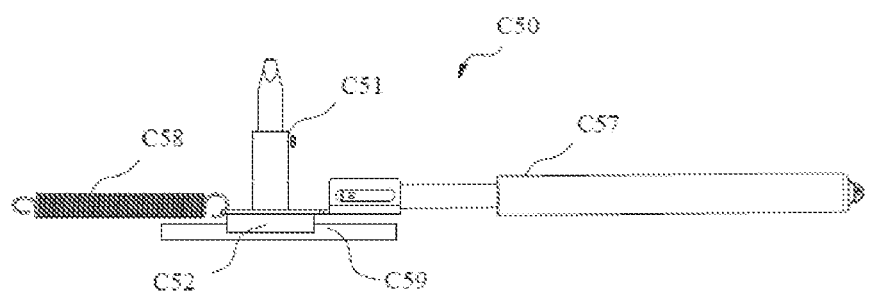
FIG. 38 is a schematic structural diagram of an unlocking device according to an embodiment of the embodiment 4 of the present invention.

As shown in FIG. 38, the unlocking device C50 is mounted on the upper surface of the upper board C10, and includes a guide rail C59 mounted on the upper surface of the upper board C10, and a movable seat C52 mounted on the guide rail C59, and an unlocking ejector rod 51 mounted on the upper surface of the movable seat C52, for driving the push rod C51 to move the movable seat C52 along the guide rail C59.

Figure 36:
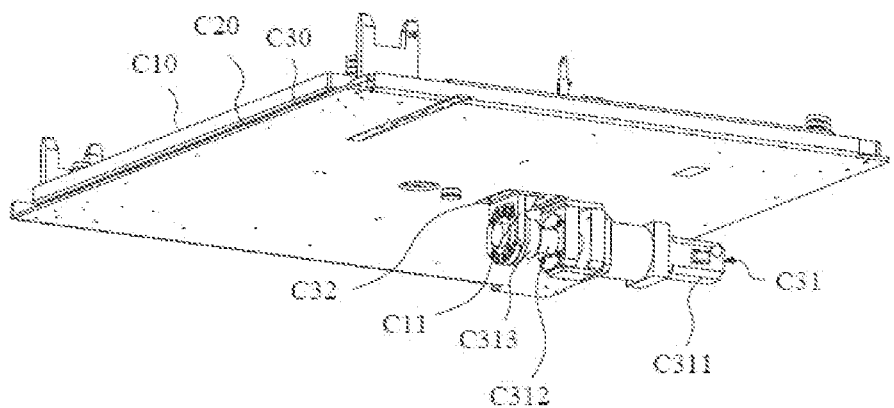
FIG. 36 is a schematic view showing the bottom of a battery mounting portion according to an embodiment of the embodiment 4 of the present invention.

As shown in FIG. 36, the movement-driving device C31 is for driving the horizontal movement of the upper board C10, including a ball screw C312 mounted on the lower surface of the upper board C10, and a driving device C311 for moving the driving ball screw C312 fixed to the fixing point. The fixing point here may be the lifting board B27 of the scissor lifting mechanism B20.

In the present embodiment, before replacing the battery, the driving push rod C57 of the unlocking device C50 drives the movable seat C52 to horizontally move along the upper surface of the upper board C10 along the guide rail C59, and stays at the unlocking point of the battery locking mechanism of the electric vehicle, and then the scissor lifting mechanism B20 is driven to rise, and the unlocking ejector rod C51 contacts the unlocking point in the battery locking mechanism during the ascending process and raising up the unlocking point to unlock the battery. During the battery replacing process, if the battery mounting position of the upper board C10 and the electric vehicle is not aligned, the ball screw C312 can be driven to rotate by the driving device C311, so that the upper board C10 is horizontally moved relative to the fixing point (lifting board B27). Therefore, the unlocking device C50 of the upper board C10 and the position of the battery locking mechanism of the electric vehicle are accurately aligned.

By the cooperation of the unlocking ejector rod C51, the driving push rod C57 and the movable seat C52, the unlocking ejector rod C51 can be controlled to move on the predetermined track, and the unlocking of the battery locking mechanism on the electric vehicle is automatically realized, so that the battery is separated from the electric vehicle and replaced by the electric vehicle, and be replaced by the movable battery replacing platform 103 automatically. The moving direction of the upper board C10 and the movable battery replacing platform 103 under the control of the movement-driving device C31 is perpendicular, and the alignment requirement at the time of battery replacement can be accurately realized. The above process is fully automated and requires no manual intervention to improve battery replacement efficiency.

Figure 39:
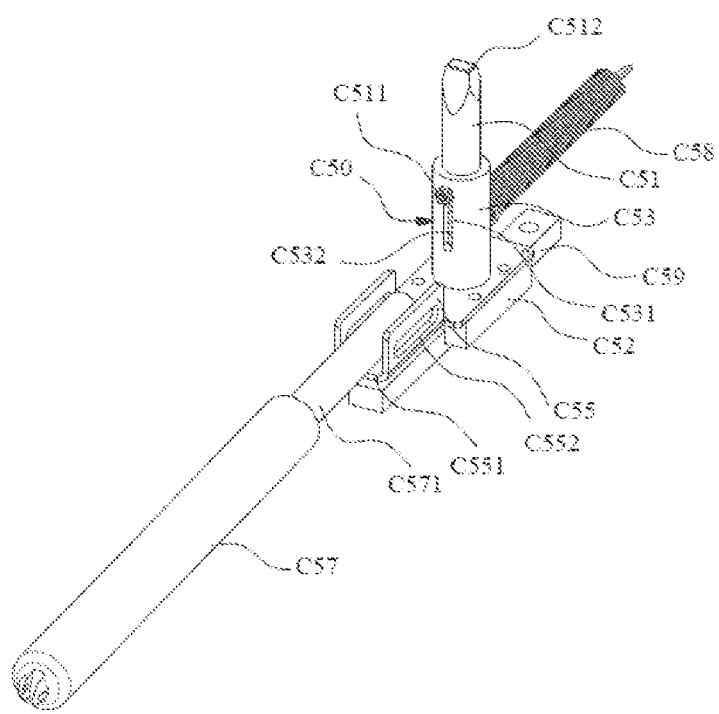
FIG. 39 is a perspective view of FIG. 41.

As shown in FIG. 39, in an embodiment of the present invention, the unlocking device C50 further includes a hollow fixed cylinder C53 fixed vertically on the upper surface of the movable seat C52, and a spring C532 is placed in the fixed cylinder C53. The bottom end of the unlocking ejector rod C51 is movably mounted in the fixed cylinder C53 by a spring and cannot be detached from the fixed cylinder C53 while being urged by the spring C532 at the opening of the fixed cylinder C53. When the unlocking ejector rod C51 is in contact with the unlocking point of the battery, it can be retracted into the fixed cylinder C53 within a certain range, and the locking ejector rod C51 is prevented from colliding with the unlocking point to cause damage.

In one embodiment of the present invention, a strip-shaped groove C531 extending along the axial direction of the fixed cylinder C53 may be opened on the side wall of the fixed cylinder C53, and an end of the unlocking plunger C51 located in the fixed cylinder C53 is provided with a pallet-shaped groove. When the limiting member 511 of the 531 is moved by the elastic force of the spring C532, the limiting member C511 can synchronously slide with the unlocking plunger C51 in the strip groove C531 to prevent the unlocking plunger C51 from being disengaged from the fixed cylinder C53. In order to facilitate the unlocking of the unlocking ejector rod C51 in contact with the unlocking point, one end of the unlocking ejector rod C51 located outside the fixed cylinder may be a contracted tapered end C512.

In an embodiment of the present invention, a chute seat C55 may be disposed on a side of the movable seat C52 near the driving push rod C57. The chute seat C55 has a chute C551 disposed along the stretchable direction of the driving push rod C57, and the driving rod is driven. The push rod C57 is provided with a fixing member that is inserted into the chute C551, and the driving push rod C57 drives the movable seat C52 and the unlocking ejector rod C51 to move horizontally through the fixing member sliding along the chute C551. The structure can make the movable seat C52 have a passive range of motion, that is, the movable seat C52 or the unlocking ejector rod C51 can move within the length of the chute C551 when encountering the reverse force, thereby avoiding driving the push rod C57 being connected directly and thus deformation may occur between thereof.

In an embodiment of the present invention, the unlocking device C50 may further include a returning device that keeps the movable seat C52 in the unlocked position at all times, and the returning device includes stretchable elastic member C58 mounted on the opposite side of the movable seat C52 and the driving push rod C57. The elastic member C58 always applies a pulling force to the movable seat C52 so that the movable seat C52 is located at a designated position of the guide rail C59, thereby restricting the unlocking ejector rod C51 at a position corresponding to the unlocking point. The elastic member C58 may be an elastic member such as a spring.

As shown in FIG. 36, in one embodiment of the present invention, a moving drive device C31 for causing relative movement of the upper board C10 can be mounted on the upper board C10. The movement-driving device C31 is configured to drive the upper board C10 to generate horizontal movement at the current position, and specifically includes a ball screw C312 mounted on the lower surface of the upper board C10, and a driving device C311 for moving the fixed ball screw C312 is fixed to the fixing point. The fixing point here may be a movable battery replacing platform C103 for replacing the battery, which is a fixed position relative to the upper board C10.

During the battery replacing process, if the battery mounting position of the upper board C10 and the electric vehicle is not aligned, the ball screw C312 can be driven to rotate by the driving device C311, so that the upper board C10 is horizontally moved relative to the movable battery replacing platform C103, thereby the unlocking device C50 of the upper board C10 and the position of the battery locking mechanism of the electric vehicle are accurately aligned.

In order to facilitate the movement of the upper board C10, the pushing board C11 may be fixed on the lower surface of the upper board C10, and the ball nut C313 may be threaded on the ball screw C312, and the pushing board C11 and the ball nut C313 are fixed with each other. When the driving device C311 drives the ball screw C312 to rotate, the ball nut C313 can move along the ball screw C312, and then the upper board C10 is driven to move in the moving direction of the ball screw C312 through the fixed pushing board C11, and the pushing board C11 is also mounted on the ball screw C312 through a threaded hole, that is, a through hole which is threaded and fitted with the ball screw C312 is opened on the pushing board C11, and when the driving device C311 drives the ball screw C312 to rotate, the pushing board C11 threaded connected the ball screw C312 drives the upper board C10 to move horizontally.

As shown in FIGS. 35 and 36, in an embodiment of the present invention, the battery mounting portion C further includes a lower board C30 mounted between the upper board C10 and the lifting board B27, and the lower board C30 is fixed to the lifting board B27. The upper board C10 is placed on the upper surface of the lower board C30, the ball screw C312 is fixed on the lower surface of the upper board C10, the driving device C311 is fixed on the lower surface of the lower board C30, and the sliding hole C32 is opened at the position corresponding to the lower board C30 and the ball screw C312, the driving device C311 is for driving the ball screw 312 passing through the sliding hole C32 to cause the upper board C10 to horizontally move relative to the lower board C30. Specifically, the fixing structure of the ball screw C312 and the upper board C10 may be: a ball nut C313 is covered on the ball screw C312, and a pushing board C11 is fixed on the lower surface of the upper board C10, and the ball nut C313 is fixed to the pushing board C11. The ball screw C312 is then defined on the lower surface of the upper board C10. The driving device C311 may be a feeding motor, and the feeding motor may be directly connected to the ball screw C312 or may be connected to the ball screw C312 through a speed reducer.

In the present embodiment, the driving device C311 can be kept stationary while the ball screw C312 is controlled to rotate, and the upper board C10 is relatively moved. In the present embodiment, the angle at which the battery is mounted or the battery is unlocked can be adjusted by the relative movement of the upper board C10, and the efficiency of automatically replacing the battery by the battery mounting portion C can be improved.

Figure 37:
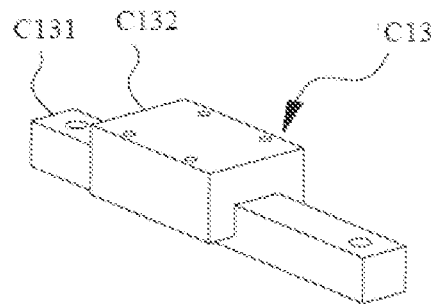
FIG. 37 is a schematic structural view of a sliding device according to an embodiment of the embodiment 4 of the present invention.

As shown in FIG. 37, in order to facilitate the movement of the upper board C10, in one embodiment of the present invention, a sliding device C13 having the same moving direction as the ball screw C312 may be installed between the upper board C10 and the lower board C30. The power output of the driving device C13 can be reduced by the sliding device C13 while making the movement of the upper board C10 smoother.

Specifically, the sliding device C13 may include a slide rail C131 fixed to the upper surface of the lower board C30, and a slider C132 is fixed to the lower surface of the upper board C10 and engaged with the slide rail C131. When the upper board C10 is moving, the slider C132 is simultaneously driven to move on the sliding rail C131. In order to reduce the gap between the upper board C10 and the lower board C30, a receiving groove C12 protruding from the upper surface of the upper board C10 may be disposed at a position corresponding to the upper board C10 and the sliding rail C131, and the slider C132 is fixed in the receiving groove C12. The sliding rail C131 protrudes from the upper surface of the lower board C30 and enters the receiving groove C12 of the upper board C10, and the slider C132 is simultaneously fixed in the receiving groove C12 and is engaged with the sliding rail C131. When moving, the upper board C10 drives the slider C132 to move relative to the slide rail C131 through the receiving groove C12.

Figure 40:
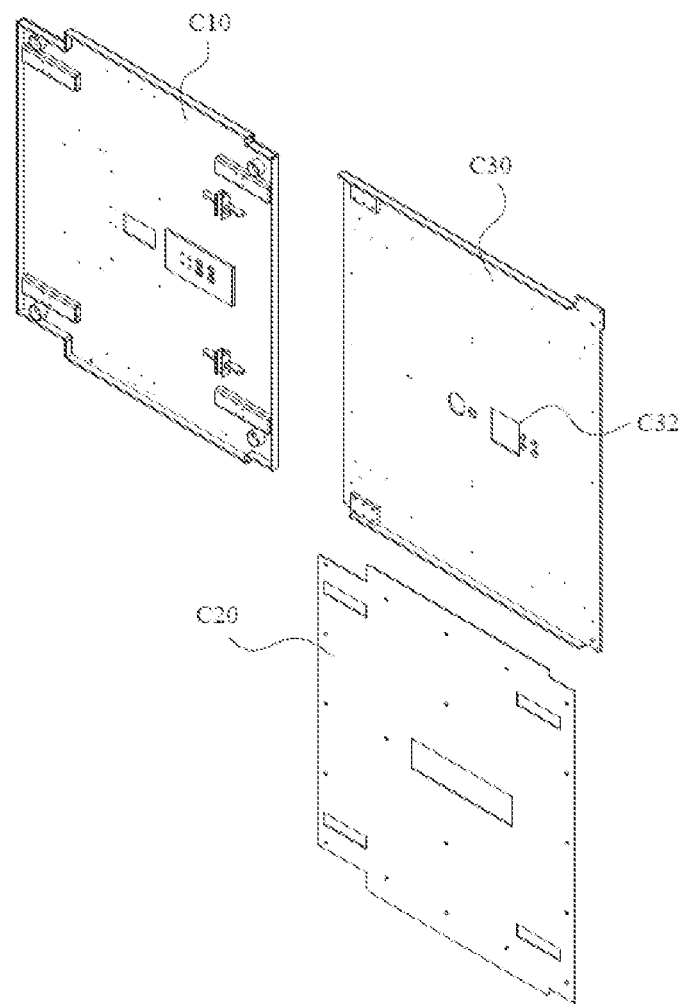
FIG. 40 is a schematic structural diagram of a battery replacing platform according to an embodiment of the embodiment 4 of the present invention.
Figure 41:
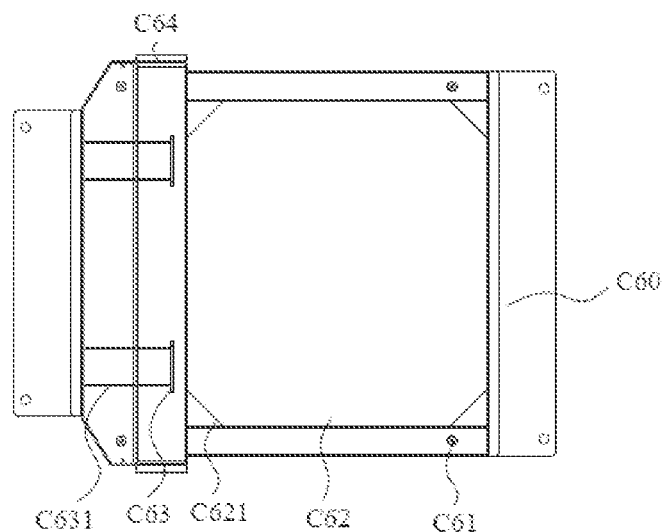
FIG. 41 is a schematic structural view of a battery tray according to an embodiment of the embodiment 4 of the present invention.
Figure 42:
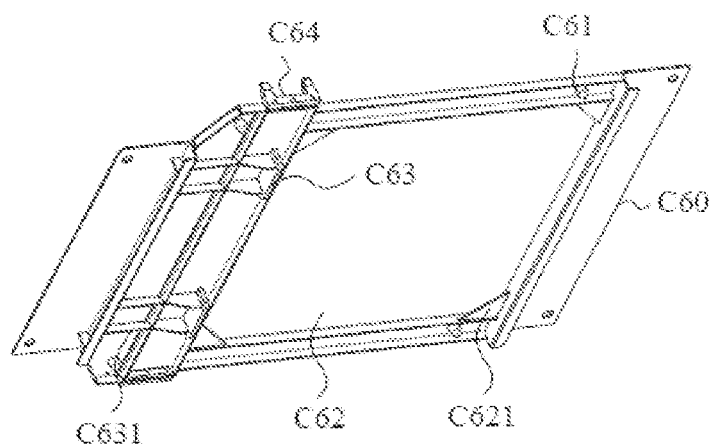
FIG. 42 is a perspective view of FIG. 41.
Figure 43:
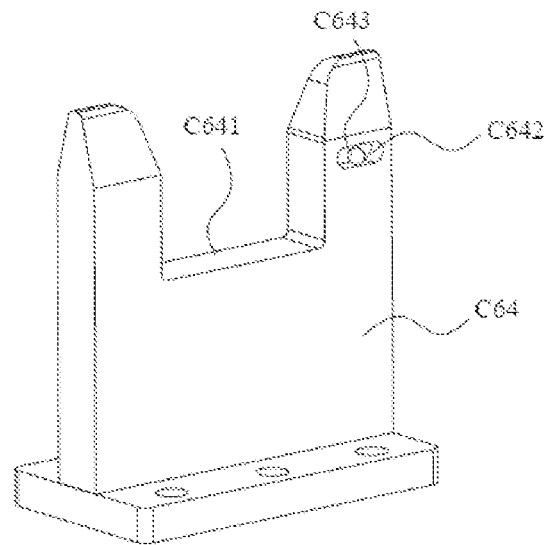
FIG. 43 is a schematic structural view of a bridge column according to an embodiment of the embodiment 4 of the present invention.
Figure 44:
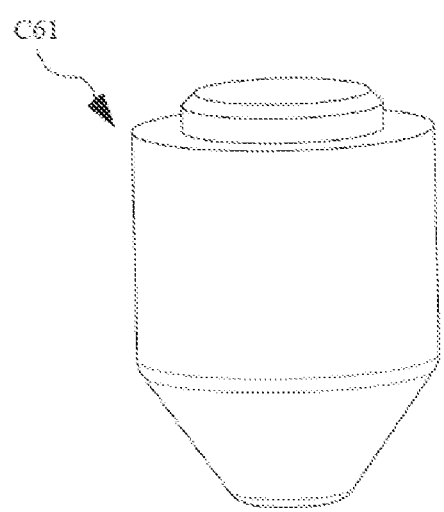
FIG. 44 is a perspective view of the positioning rod of FIG. 41.
Figure 45:
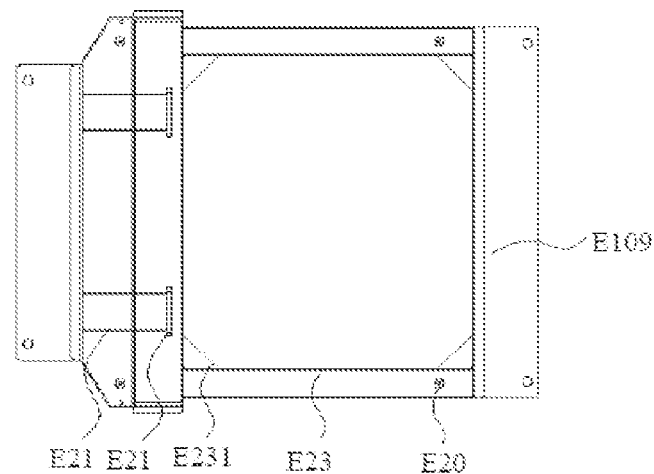
FIG. 45 is a schematic structural view of a battery tray according to an embodiment of the embodiment 5 of the present invention.
Figure 46:
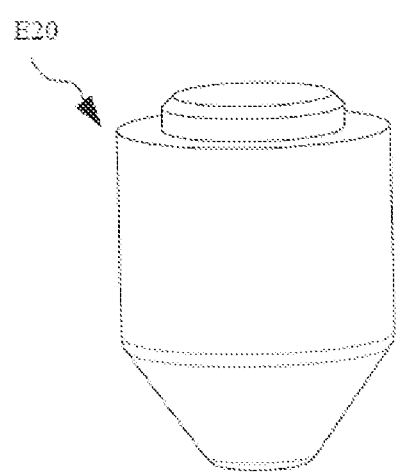
FIG. 46 is a schematic structural view of the tapered rod of FIG. 45.
Figure 47:
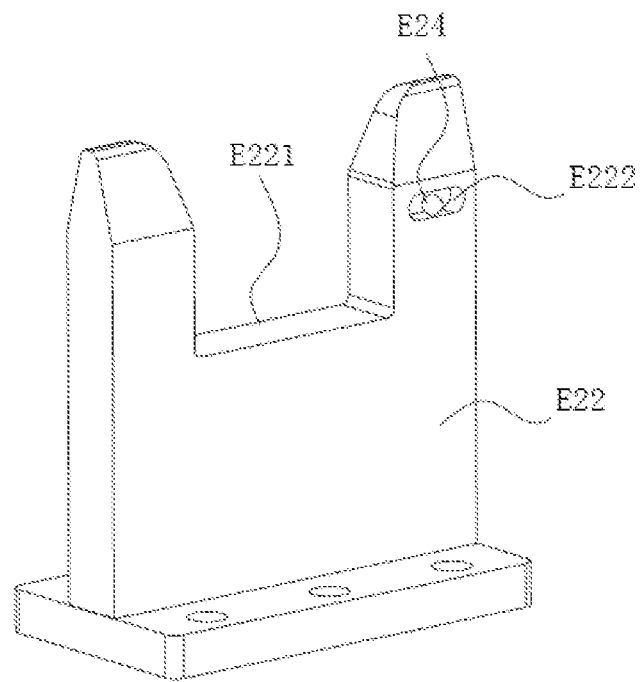
FIG. 47 is a schematic structural view of a guide board according to an embodiment of the embodiment 5 of the present invention.

As shown in FIG. 40, further, in an embodiment of the present invention, a sliding board C20 which reduces the frictional force when the upper board C10 is moved may be mounted between the upper board C10 and the lower board C30. The sliding board C20 can be fixed as an intermediate layer on the lower board C30 to reduce the frictional force of the upper board C10 while moving. The specific sliding board C20 can be made of a Poly tetra fluoro ethylene board.

As shown in FIGS. 35, 41, 42, 43, and 44, in one embodiment of the present invention, a battery tray C60 may be mounted on the upper surface of the upper board C10, and the battery tray C60 is a frame structure and is in the middle of the battery tray C60. A hollow mounting opening C62 is provided, and a positioning rod C61 for positioning is disposed on the lower surface. For ease of installation, the positioning rod C61 can be a tapered rod and a guiding board C64 is vertically mounted on opposite sides of the upper surface of the upper board. The guide board C64 is fixed to the battery tray C60 through one end, and the other end is a groove C641 having a U-shaped opening.

At the same time, a fixing seat C15 on which the spring C16 is mounted is disposed at a position corresponding to the positioning rod C61 on the upper surface of the upper board C10. The hole of the mounting spring C16 is a tapered hole, and after the battery tray C60 is inserted into the corresponding spring C16 through the positioning rod C61, it is inserted into the tapered hole and mounted on the upper board C10.

When in use, the battery tray C60 is movably placed on the upper board C10, and the battery to be replaced or replaced is placed on the tray C60. The bridge column C64 on the tray C60 forms a plug position with the positioning block on the side of the battery by passing through the groove C641, the weight of the battery causes the tray C60 to completely press against the elastic force of the spring C16 and press on the upper board C10, and the tapered rod C61 is simultaneously inserted into the tapered hole to form a stable fixed relationship, and the bottom of the battery is installed through the bottom. Mounting opening C62 approaches or contacts upper board C10 to facilitate detection of the state of the battery by sensors mounted on upper board C10, thereby providing control information for control of the control unit.

In order to improve the stability of the battery tray C60, the number of the positioning rod C61 may be four and symmetrically distributed at the four corners of the battery tray C60. In order to know whether or not the battery is placed in position, a detecting device C643 for detecting the plugged battery may be provided on the guide board C64, and the detecting device C643 may be mounted on the guide board C64 through a mounting hole C642 provided on the guide board C64. The detecting device C643 can be a magnetic member or a sensor. The magnetic member can interact with the magnetic member of the corresponding portion of the battery to determine if the battery has been placed in place. The sensor can sense to determine if the battery is in place or not. The mounting opening C62 may be rectangular, and a reinforcing board C621 may be respectively disposed at four corners of the mounting opening C62. The reinforcing board C621 can increase the strength of the entire tray.

In an embodiment of the present invention, the board-shaped pallet C63 may be vertically fixed on one side of the lower surface of the battery tray C60, and a slot C14 to be inserted by the pallet C63 could be disposed at a position of the upper surface corresponding to the\the pallet C63. After the battery tray C60 is mounted on the upper board C10, the pallet C63 is engaged with the slot C14, thereby reducing the amount of movement of the battery tray C60 relative to the upper board C10.

The number of the specific slots C14 may be two, the two slots C14 are arranged side by side on the upper surface side of the upper board C10, and the pallet C63 may also be set to two and respectively connected to the corresponding slots C14. Further, in order to increase the strength of the pallet C63, a corresponding reinforcing board C631 may be disposed on one side of the pallet C63, and the reinforcing board C631 is simultaneously perpendicularly connected to the lower surface of the battery tray C60 and the pallet C63.

Embodiment 5

The quick replacing system of the present embodiment is substantially the same as the quick replacing system 100 shown in FIG. 1 of Embodiment 1, and generally includes a battery holder 101 for arranging the battery 104, a palletizer 102, and a movable battery replacing platform 103.

The battery 104 placed in the battery holder 101 includes a replacement battery for the electric vehicle 105, and a rechargeable battery to be replaced by the electric vehicle 105. The battery holder 101 is provided with a plurality of placement layers formed of frames.

The movable battery replacing platform 103 is configured to remove and transport the battery to be charged on the electric vehicle 105 to the palletizer 102, while receiving the replacement battery from the palletizer 102 and mounting it on the electric vehicle 105; including a lifting device for traveling and lifting the battery 104, and a battery mounting portion which is mounted on the lifting device for automatically removing the battery to be charged on the electric vehicle 105 or automatically mounting the replacement battery to the electric vehicle 105.

The palletizer 102 is for placing the replacement battery to be replaced of the movable battery replacing platform 103 in the battery holder 101, and at the same time, removing the replacement battery from the battery holder 101 to the movable battery replacing platform 103; the palletizer 102 performs movement in the horizontal and vertical directions relative to the battery holder 101 through tracks, which includes an extendable telescoping bracket for picking up and descending the battery 104.

When in operation, the battery holder 101, the palletizer 102 and the movable battery replacing platform 103 constitute a complete electric vehicle automatic battery quick replacing system, which can realize the assembly line quick replacing operation for a plurality of electric vehicles. When replacing, as long as the electric vehicle stops at the designated position, the battery can be automatically replaced within five to ten minutes. The entire replacement process does not require manual intervention, which reduces labor intensity and greatly improves replacement efficiency.

The movable battery replacing platform in the present embodiment is substantially the same as the movable battery replacing platform 103 shown in FIG. 2 of embodiment 1, which includes a lifting portion 107, a battery mounting portion 108 and a travel-driving portion 106.

The travel-driving portion 106 is used to drive the movement of the entire device during the pick-and-place process and replacement of the battery 104. The specific driving method may be any existing hoisting drive, rack and winching drive, roller drive or track drive, etc., which can realize the movement of the movable battery replacing platform 103.

The lifting portion 107 is mounted on the travel-driving portion 106 for realizing the lifting control of the battery 104 at the bottom of the electric vehicle 105 during the process of replacing the battery 104, including a lifting device 1071 that can be vertically moved up and down, and the lifting driving portion 1072 that drives the lifting device 1071 to ascend and descend. The specific lifting device 1071 may be any existing structure capable of stretching in the vertical direction, such as a stretchable rod structure, a rail structure, a stretchable tube structure, or the like. The lifting driving portion 1072 may be a conventional power such as a hydraulic drive, an electric drive, or a pneumatic drive.

The battery mounting portion 108 is disposed at the top of the lifting device 1071 for placing a replacement battery or a replaced battery to be charged. The upper surface of the battery mounting portion 108 is mounted with an unlocking device for the electric vehicle under the control of the corresponding driving device. The battery locking mechanism is unlocked to automatically disassemble and lock the battery 104 on the electric vehicle 105. The battery mounting portion 108 is movably mounted with a battery tray for carrying and mounting the positioning battery.

The movable battery replacing platform 103 of the present embodiment moves to the bottom of the electric vehicle 105 under the control of the travel-driving portion 106, and the lifting driving portion 1072 drives the lifting device 1071 to ascend, and the unlocking device and the electric vehicle on the battery mounting portion 108 are driven contacting the battery locking device in the bottom battery mount to release the locked battery, and then controlling the battery mounting portion 108 to move in the horizontal direction to disengage the unlocked battery from the electric vehicle and directly drop on the battery mounting portion 108, the lifting device 1071 is controlled to descend by the lifting driving portion 1072, and the travel-driving portion 106 is driven to move to the battery holder 101 by the travel-driving portion 106, and the battery to be charged is removed by the palletizer 102. At the same time, the replacement battery is replaced; the travel-driving portion 106 drives the movable battery replacing platform 103 to move back to the lower side of the electric vehicle 105, and the lifting device 1071 drives the lifting device 1071 to ascend, so that the battery mounting portion 108 stuck the replacement battery into the battery mounting seating of the electric vehicle 105, the battery mounting portion 108 is then translated to lock the replacement battery in the battery mounting seating, and then the lifting driving portion 1072 is descend by the lifting device 1071; and quick replacing process by the travel-driving portion 106 moves the platform 103 for the battery out of the bottom of the electric vehicle 105, thus achieving an electric vehicle battery 105 automatically.

As shown in FIGS. 45, 46, 47, and 48, a battery tray according to an embodiment of the present invention generally includes a tray E109, and a guide board E22 for supporting the battery.

The tray E109 is a frame structure, and a hollow mounting opening E23 is disposed in a middle portion, and a tapered rod E20 is vertically disposed on a periphery of the lower surface for positioning the tray E109 on the surface of the battery platform mounting portion E108 of the battery replacing platform. The rod E20 may have a conical shape at one end and a cylindrical structure at the other end. The mounting opening E23 may be rectangular and a reinforcing board E231 may be fixed at each of the four corners of the rectangle. The reinforcing board E231 is triangular and fixed at the same time to the adjacent sides of one corner.

The guide board E22 is vertically disposed on the periphery of the upper surface of the tray E109. The guide board E22 is disposed at a plurality of positions, respectively disposed at the periphery of the tray, one end of which is fixedly connected with the tray E109, and the other end is provided with a U-shaped slot E221 with an opening upward. The shape groove E221 is matched with the shape of the fixing block on the side of the battery, and the battery is fixedly coupled to the U-shaped groove through the fixing block on the surface thereof.

During installation, the tray E109 can be aligned with the battery mounting portion of the movable battery replacing platform E103 through the tapered rod E20 on the lower surface, and a tapered mounting seat corresponding to the shape of the tapered rod E20 can be disposed on the battery mounting portion to facilitate the installation of the tray E109. The battery is engaged with the guide board E22 on the tray by a fixing block on its surface.

The tray of the embodiment adopts a conical limit structure, so that the battery can be prevented from being displaced greatly after the battery is placed, and at the same time, the battery can be left in a small range to facilitate the docking of the battery with the battery mount on the electric vehicle.

In one embodiment of the present invention, there are four tapered rod E20 may be mounted, and the four tapered rods E20 are respectively disposed at four corners of the lower surface of the tray E109 to improve the stability of the tray E109 after being placed.

In an embodiment of the present invention, the guiding board E22 may be provided with a detecting device E24 for detecting whether the battery is placed in position. Specifically, it may be a magnetic material or a sensor. The installation manner may be that a corresponding hole E222 is disposed on the guide board E22, and the detecting device E24 is installed in the hole E222. When the battery is placed on the tray E109, it can be detected by the detecting means E24, thereby transmitting a signal of the battery in place to the control unit.

In an embodiment of the present invention, in order to prevent the tray E109 from moving, the pallet E21 may be vertically mounted on the lower surface of the tray E109, and the pallet E21 may be replaced when the tray E109 is mounted on the movable battery replacing platform E103. The grooves on the moving platform E103 are plugged and fixed to further secure the tray. A specific pallet E21 can be provided with two pieces, and two pallets E21 are arranged side by side.

Figure 48:
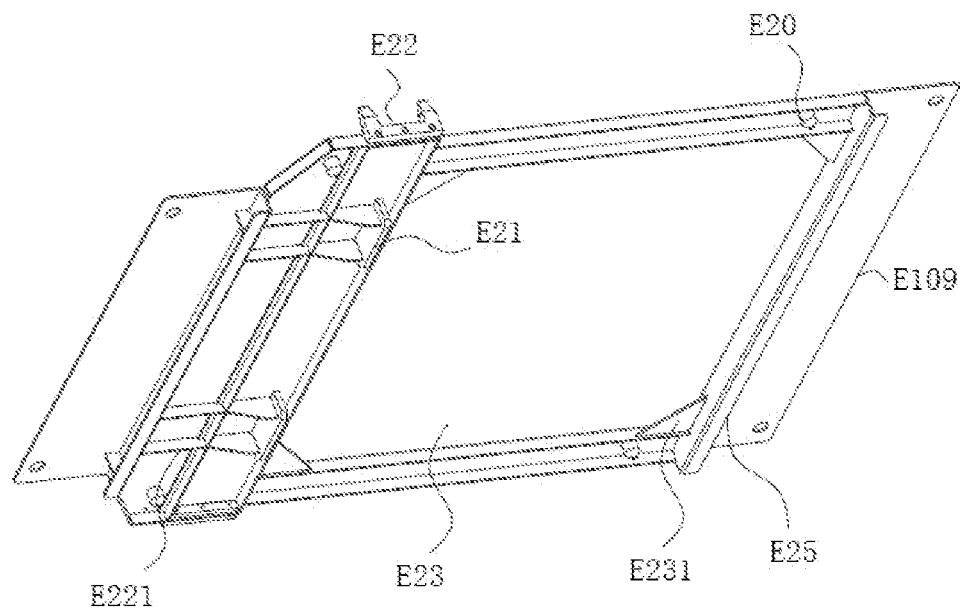
FIG. 48 is a perspective view of FIG. 45.

As shown in FIG. 48, further, an L-shaped right angle pallet E25 may be fixedly mounted on the lower surface of the tray E109. The surface of the movable battery replacing platform E103 is provided with a support board for placing the pallet E25, and the support board is vertically set on the surface of the movable battery replacing platform, and has a step on the top that cooperates with the pallet E25 for placement of the pallet, the vertical direction of the step having an accurate arc-ramp that guides the pallet for sliding.

Further, in order to improve the firmness of the pallet E21, in one embodiment of the present invention, a reinforcing board E211 vertically fixed to the lower surface of the tray E109 may be vertically connected to one side of the pallet E21.

In this regard, it will be appreciated by those skilled in the art that the present invention may be presently described and described herein, without departing from the spirit and scope of the invention, the content directly determines or derives many other variations or modifications consistent with the principles of the invention. Therefore, the scope of the invention should be understood and construed as covering all such other modifications or amendments.

The invention claimed is:

1. An unlocking device for battery platform, said unlocking device comprising:

a guide rail;

a movable seat mounted on the guide rail;

an unlocking ejector rod vertically mounted on the movable seat; and a driving member to drive the movable seat to move horizontally along a plane of the guide rail, the driving member is a driving push rod;

the movable seat mounted on the guide rail includes a fixing cylinder fixed vertically mounted direct on the movable seat, and the unlocking ejector rod is movably mounted inside of the fixing cylinder, and a second spring is provided in the fixing cylinder, the second spring is configured to apply an upward thrust to the unlocking ejector rod.

2. The unlocking device for battery platform of claim 1, further comprising a returning device, and the returning device includes a stretchable elastic member mounted on a side of the movable seat opposite to the driving member, the returning device is configured to apply a force to the movable seat to return the movable seat to a designated position.

3. The unlocking device for battery platform of claim 1, further comprising a strip-shaped groove extending along an axial direction of the fixing cylinder formed on a side wall of the fixing cylinder, a limiting member snapped in the strip-shaped groove is provided on a side within the fixing cylinder of the unlocking ejector rod.

4. A battery replacing platform for replacing a battery of an electric vehicle, the battery replacing platform comprising:

an upper board for carrying a replacement battery; an unlocking device mounted on the battery replacing platform for unlocking the battery locking device mounted on the electric vehicle; and a movement-driving device which is connected and mounted to the upper board by a driving output end, in order to drive the upper board to move in a horizontal direction;

wherein the unlocking device comprises a guide rail; a movable seat mounted on the guide rail, an unlocking ejector rod mounted on the upper surface of the movable seat, and a driving member that drives the movable seat to move horizontally along a plane of the upper board; the driving member is a driving push rod;

the movable seat mounted on the guide rail includes a fixing cylinder fixed vertically mounted direct on the movable seat, and the unlocking ejector rod is movably mounted inside of the fixing cylinder, and a second spring is provided in the fixing cylinder, the second spring is configured to apply an upward thrust to the unlocking ejector rod.

5. The battery replacing platform of claim 4, wherein the battery replacing platform comprises a lower board which is mounted under the upper board, the movement-driving device drives the upper board to move horizontally relative to the lower board.

6. The battery replacing platform of claim 4, wherein the movement-driving device comprising a driving portion and a screw rod mounted on the driving output end, the pushing board is fixedly mounted to the lower surface of the upper board, the pushing board is connected to the screw rod through a threaded hole, or fixedly mounted with a nut covered on the screw rod.

7. The battery replacing platform of claim 6, wherein the screw rod is a ball screw, and the nut is a ball nut.

8. The battery replacing platform of claim 4, wherein the upper surface of the upper board is further provided with a bridge column for positioning and mounting the battery, wherein the bridge column has a groove with an upward opening, and the bridge column is provided with a positioning magnetic steel.

9. The battery replacing platform of claim 4, wherein the upper surface of the upper board is further provided with a sensor for detecting whether the battery is in place or not.

10. The battery replacing platform of claim 4, further comprising: a battery tray is mounted on the upper surface of the upper board, wherein a positioning rod is mounted on a lower surface of the battery tray, wherein a spring fixing seat is mounted on the upper surface of the upper board, wherein the positioning rod is matched and mounted with the spring fixing seat on the upper surface of the upper board.

11. The battery replacing platform of claim 10, wherein the upper surface of the battery tray has a plurality of guide boards having grooves with upward openings for mounting and fixing the battery.

12. The battery replacing platform of claim 4, wherein the movement-driving device is mounted to a lower surface of the lower board by a fixing seat, and a driving output end of the movement-driving device is connected with a pushing board, wherein the pushing board passes through a mounting hole of the lower board and is fixed to the lower surface of the upper board.

13. The battery replacing platform of claim 12, further comprising: a sliding device is mounted between the upper board and the lower board, wherein the sliding device includes a sliding rail fixed to an upper surface of the lower plate and a slider fixed to the lower surface of the upper board, wherein the slider is engaged with the sliding rail.

14. The battery replacing platform of claim 13, further comprising: a receiving groove protruding upwardly is disposed at a position of the upper board which is corresponding to the sliding rail, wherein the slider is fixed within the receiving groove.

15. The battery replacing platform of claim 14, further comprising: a sliding board is provided between the upper board and the lower board for reducing friction between the upper board and lower board.

16. A movable battery replacing platform, wherein the movable battery replacing platform comprises a lifting portion, a travel-driving portion and a battery mounting portion;

the battery mounting portion is mounted on a top of the lifting portion for placing a battery to be replaced or a replaced battery, wherein the battery mounting porting is provided with the battery replacing platform an upper board for carrying a replacement battery; an unlocking device mounted on the battery replacing platform for unlocking the battery locking device mounted on the electric vehicle; and a movement-driving device which is connected and mounted to the upper board by a driving output end, in order to drive the upper board to move in a horizontal direction; wherein the unlocking device comprises a guide rail, a movable seat mounted on the guide rail, an unlocking ejector rod mounted on the upper surface of the movable seat, and a driving member that drives the movable seat to move horizontally along a plane of the upper board, the driving member is a driving push rod; the movable seat mounted on the guide rail includes a fixing cylinder fixed vertically mounted direct on the movable seat, and the unlocking ejector rod is movably mounted inside of the fixing cylinder, and a second spring is provided in the fixing cylinder, the second spring is configured to apply an upward thrust to the unlocking ejector rod;

the lifting portion is mounted on the travel-driving portion for the implement of lifting the battery during replacing the battery;

the travel-driving portion is used for driving the movable battery replacing platform to move on the ground.

* * * * *